United States Patent
Nagaoka et al.

(10) Patent No.: US 6,998,825 B2
(45) Date of Patent: Feb. 14, 2006

(54) DC-DC CONVERTER

(75) Inventors: Kazuhiko Nagaoka, Ibaraki (JP);
Satoshi Wada, Ibaraki (JP); Tsukasa Kawahara, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/985,882

(22) Filed: Nov. 12, 2004

(65) Prior Publication Data
US 2005/0104565 A1    May 19, 2005

(30) Foreign Application Priority Data
Nov. 14, 2003   (JP) ............................. 2003-385377

(51) Int. Cl.
*G05F 1/652*    (2006.01)
(52) U.S. Cl. ........................ 323/222; 323/224; 323/284
(58) Field of Classification Search ............... 323/222, 323/284, 224
See application file for complete search history.

(56) References Cited

U.S. PATENT DOCUMENTS 5,404,095 A * 4/1995 Lammers .................... 323/290
5,929,614 A * 7/1999 Copple ........................ 323/222
6,507,174 B1 * 1/2003 Qian ........................... 323/222
6,512,352 B1 * 1/2003 Qian ........................... 323/282
6,696,821 B1 * 2/2004 Haraguchi et al. .......... 323/222
6,936,997 B1 * 8/2005 Mullett ....................... 323/222

FOREIGN PATENT DOCUMENTS

JP    2003-164143    6/2003

* cited by examiner

*Primary Examiner*—Bao Q. Vu
(74) *Attorney, Agent, or Firm*—McDermott Will & Emery LLP

(57) ABSTRACT

An inductor 6 accumulates an energy therein or releases the accumulated energy according to the state of a main switch element 10 being turned ON/OFF. When the inductor 6 releases an energy, if a sub-switch element 12 is in the ON state, a current is passed through a circuit downstream of the sub-switch element 12, thereby increasing an output voltage VO1. The sub-switch element 12 is a P-channel MOS transistor, and a sub-switch control circuit 18 outputs a control signal VCT1 for the sub-switch element 12. A level shift circuit 19 receives an output-side potential VP of the inductor 6, and outputs, as a control signal VG1 applied to the gate of the sub-switch element 12, the potential VP if the control signal VCT1 is at the L level or a potential (VP−VM) lower than the potential VP if the control signal VCT1 is at the H level. Thus, the output voltage of the DC-DC converter can be made precisely equal to the target voltage.

11 Claims, 15 Drawing Sheets

DC-DC CONVERTER

BACKGROUND OF THE INVENTION

1. Field of the Invention

The present invention relates to a DC-DC converter, and more particularly to a DC-DC converter using an inductor and a switch element for boosting a DC voltage supplied from a power source to an intended level.

2. Description of the Background Art

A type of multiple-output DC-DC converter in which a single boost inductor is shared by a plurality of boost converters has been known in the art. FIG. 11 is a circuit diagram illustrating a conventional multiple-output DC-DC converter 100 disclosed in Japanese Laid-Open Patent Publication No. 2003-164143. Referring to FIG. 11, the DC-DC converter 100 includes an input terminal 105, an inductor 106, a main switch element 110, a control circuit 111, a sub-switch element 122, rectifier circuits 113 and 123, smoothing circuits 114 and 124 and output terminals 115 and 125. During the operation of the DC-DC converter 100, a DC power source 60 is connected to the input terminal 105, and loads 61 and 62 to the output terminals 115 and 125, respectively.

Referring to FIG. 11, the rectifier circuit 113, the smoothing circuit 114 and the output terminal 115 together function as a first output circuit, and the sub-switch element 122, the rectifier circuit 123, the smoothing circuit 124 and the output terminal 125 together function as a second output circuit. The DC-DC converter 100 boosts a DC voltage supplied from the DC power source 60 with a single inductor, and outputs a first output voltage VO1 through the output terminal 115 and a second output voltage VO2 through the output terminal 125.

The DC power source 60 provides a DC power source input potential VIN to the DC-DC converter 100. The inductor 106 receives a power supply from the DC power source 60 to accumulate an energy therein, and produces an induced voltage higher than the power source input potential VIN according to the accumulated energy. The main switch element 110 is an N-channel MOS transistor. The main switch element 110 is turned ON/OFF by a control signal VG0 applied to the gate thereof to selectively accumulate an energy in the inductor 106 or produce an induced voltage across the inductor 106.

The rectifier circuit 113 is a diode, for example, and rectifies the incoming current. The smoothing circuit 114 removes ripples from the current having passed through the rectifier circuit 113. The current having passed through the smoothing circuit 114 flows into the load 61 via the output terminal 115. The rectifier circuit 123, the smoothing circuit 124 and the output terminal 125 also function in the same manner. The loads 61 and 62 may each be any circuit (e.g., an LCD) receiving a power supply from the DC-DC converter 100. The load 61 is driven by the first output voltage VO1 from the output terminal 115, and the load 62 by the second output voltage VO2 from the output terminal 125.

The sub-switch element 122, being an N-channel MOS transistor, is provided between the rectifier circuit 123 and the output terminal 125. The sub-switch element 122 is turned ON/OFF by a control signal VG2 applied to the gate thereof for selectively passing a current to the load 62.

The control circuit 111 receives a power supply from the DC power source 60 to output the control signal VG0 to be applied to the gate of the main switch element 110 and the control signal VG2 to be applied to the gate of the sub-switch element 122. The control signal VG0 is switched between a high level (hereinafter referred to as the "H level") and a low level (hereinafter referred to as the "L level") at predetermined intervals, whereas the control signal VG2 is at the H level only in a period during which a current is passed to the load 62 for increasing the second output voltage VO2.

FIG. 12 is a diagram showing transitions of currents, voltages and switch elements in the DC-DC converter 100. In FIG. 12, IMS1 denotes the current flowing through the main switch element 110, and ILX the current flowing through the inductor 106. VP denotes the output-side potential of the inductor 106 (i.e., the potential at a connecting point between the inductor 106 and the main switch element 110). ISW1 denotes the output current of the rectifier circuit 113, and ISW2 the output current of the sub-switch element 122. In the following description, it is assumed that VIN<VO1<VO2 (e.g., VIN=3 V, VO1=4 V and VO2=8 V).

The operation of the DC-DC converter 100 is outlined below. Referring to FIG. 12, the control signal VG0, which is switched between the H level and the L level at predetermined intervals, is applied to the gate of the main switch element 110. Therefore, the main switch element 110 is switched between the ON state and the OFF state at predetermined intervals. While the main switch element 110 is in the ON state, the inductor 106 receives a power supply from the DC power source 60 to accumulate an energy therein. Herein, the accumulation of an energy in the inductor will be referred to as "charging", and the period during which the inductor is being charged will be referred to as the "charge period". In the charge period, the potential VP remains at 0 V.

In the instant the main switch element 110 transitions from the ON state to the OFF state, an induced voltage is produced across the inductor 106 by the energy accumulated in the inductor 106, thereby significantly increasing the potential VP. Thereafter, the inductor 106 releases the accumulated energy. Herein, the release of an energy from the inductor will be referred to as "discharging", and the period during which the inductor is being discharged will be referred to as the "discharge period".

In the discharge period, the control signal VG2 applied to the gate of the sub-switch element 122 is controlled to be at the L level or the H level. Where the control signal VG2 is at the L level in the discharge period, a current is passed through the first output circuit by the energy released from the inductor 106, thereby increasing the first output voltage VO1. Where the control signal VG2 is at the H level in the discharge period, a current is passed not only through the first output circuit but also through the second output circuit by the energy released from the inductor 106, thereby increasing both the first and second output voltages VO1 and VO2. The current ISW1 flowing through the first output circuit is rectified by the rectifier circuit 113 and smoothed by the smoothing circuit 114, whereby the first output voltage VO1 increases smoothly in the discharge period. This is similarly true for the current ISW2 flowing through the second output circuit and the second output voltage VO2.

When the accumulated energy is completely released from the inductor 106, the potential VP decreases to the power source input potential VIN. Thereafter, no current or voltage transition occurs in the DC-DC converter 100 until the control signal VG0 is brought to the H level again. Herein, the state of the inductor in this period will be referred to as the "stand-by state", and the period during which the inductor is in the stand-by state will be referred to as the "stand-by period".

As the inductor 106 undergoes the charge, discharge and stand-by periods repeatedly, the first and second output voltages VO1 and VO2 increase stepwise. If the control signal VG2 is controlled to be at the L level in the discharge period, only the first output voltage VO1 increases, whereas if the control signal VG2 is controlled to be at the H level in the discharge period, the first and second output voltages VO1 and VO2 both increase. Herein, a charge period, the following discharge period and the following stand-by period together will be referred to as a "boost period".

Referring to FIG. 12, a boost period TX1 includes a charge period t1, a discharge period t2 and a stand-by period t3, and a boost period TX2 includes a charge period t4, a discharge period t5 and a stand-by period t6. It is intended that only the first output voltage VO1 increases in the boost period TX1, whereas the first and second output voltages VO1 and VO2 both increase in the boost period TX2. In the charge period t1, merely the energy accumulation in the inductor 106 occurs, and neither one of the first and second output voltages VO1 and VO2 increases. As the charge period t1 ends and the discharge period t2 begins, the potential VP is increased significantly by the induced voltage across the inductor 106. In the discharge period t2, the control signal VG2 is controlled to be at the L level. Therefore, in the discharge period t2, a current is passed through the first output circuit by the energy released from the inductor 106, thereby increasing the first output voltage VO1. In this period, no current flows through the second output circuit, and the second output voltage VO2 does not increase. As the discharge period t2 ends and the stand-by period t3 begins, the potential VP decreases to the power source input potential VIN. In the stand-by period t3, neither one of the first and second output voltages VO1 and VO2 increases. Thus, in the boost period TX1, only the first output voltage VO1 increases.

The operation of the DC-DC converter 100 in the boost period TX2 is the same as that in the boost period TX1, except as follows. In the discharge period t5 of the boost period TX2, the control signal VG2 is controlled to beat the H level. Therefore, in the discharge period t5, a current is passed not only through the first output circuit but also through the second output circuit by the energy released from the inductor 106, thereby increasing both the first and second output voltages VO1 and VO2.

However, the DC-DC converter 100 has a problem in that the second output voltage VO2 cannot be boosted to a level higher than the power source input potential VIN, as discussed below. Assume a case where the DC-DC converter 100 attempts to further increase the second output voltage VO2, already being substantially equal to the power source input potential VIN, in a boost period TX3 in FIG. 12. In this case, as a charge period t7 ends and a discharge period t8 begins, the control signal VG0 transitions from the H level to the L level and the control signal VG2 transitions from the L level to the H level. In order to bring the sub-switch element 122, being an N-channel MOS transistor, to the ON state, the gate potential needs to be made higher than the source potential. However, with the second output voltage VO2 being substantially equal to the power source input potential VIN, even if the control signal VG2 is switched to the H level, the gate potential of the sub-switch element 122 is substantially equal to the source potential thereof, whereby the sub-switch element 122 remains in the OFF state. Therefore, no current is passed through the second output circuit by the energy released from the inductor 106, whereby the second output voltage VO2 does not increase. Thus, the DC-DC converter 100 is not capable of boosting the second output voltage VO2 to a level higher than the power source input potential VIN.

A DC-DC converter 150 illustrated in FIG. 13 is an approach to solving this problem. The DC-DC converter 150 differs from the DC-DC converter 100 in that a sub-switch element 152 is a P-channel MOS transistor and that a control circuit 151 outputs a control signal VG2 of an opposite polarity with respect to that outputted by the control circuit 111.

FIG. 14 is a diagram showing transitions of currents, voltages and switch elements in the DC-DC converter 150. In the example illustrated in FIG. 14, it is intended that only the first output voltage VO1 increases in a boost period TY1, whereas the first and second output voltages VO1 and VO2 both increase in a boost period TY2. In the discharge period t5 of the boost period TY2, the control signal VG2 is controlled to be at the L level. Thus, the gate potential of the sub-switch element 152 becomes lower than the source potential, whereby the sub-switch element 152, being a P-channel MOS transistor, is brought to the ON state. Therefore, in the discharge period t5, a current is passed not only through the first output circuit but also through the second output circuit by the energy released from the inductor 106, thereby increasing both the first and second output voltages VO1 and VO2.

Even if the second output voltage VO2 is substantially equal to the power source input potential VIN, the sub-switch element 152 can be brought to the ON state by controlling the control signal VG2 to be at the L level, thereby increasing the second output voltage VO2. This is for the following reason. The gate potential needs to be made lower than the source potential in order to bring the sub-switch element 152, being a P-channel MOS transistor, to the ON state. In the discharge period, the gate potential is at the L level, and the source potential is higher than the power source input potential VIN. Thus, the DC-DC converter 150 is capable of boosting the second output voltage VO2 to a level higher than the power source input potential VIN.

However, the DC-DC converter 150 has a problem in that the sub-switch element 152 cannot be turned ON/OFF accurately, whereby the second output voltage VO2 cannot be made equal to an intended value (hereinafter referred to as the "target voltage") This problem will now be discussed for the boost period TY1 in FIG. 14. In the boost period TY1, it is intended that only the first output voltage VO1 increases. Therefore, the sub-switch element 152 needs to be in the OFF state in the discharge period t2 of the boost period TY1. In order to bring the sub-switch element 152, being a P-channel MOS transistor, to the OFF state, the gate potential needs to be made equal to or greater than the source potential.

However, in the discharge period t2, the potential VP is significantly higher than the power source input potential VIN due to the induced voltage across the inductor 106. Therefore, even if the control signal VG2 is kept at the H level (see a portion marked "E1" in FIG. 14) in order to bring the sub-switch element 152 to the OFF state, the sub-switch element 152 is brought to the ON state in the discharge period t2 (see a portion marked "E2" in FIG. 14). Therefore, in the discharge period t2, in which only the first output voltage VO1 is supposed to increase, the second output voltage VO2 also increases due to the current ISW2 passing through the sub-switch element 152 (see a portion marked "E3" in FIG. 14). Therefore, with the DC-DC converter 150, the sub-switch element 152, being a P-channel MOS transistor, cannot be turned ON/OFF accurately, whereby the second output voltage VO2 cannot be made equal to the target voltage.

A similar problem arises also where the ON time of the sub-switch element 152 is controlled so as to adjust the increase of the second output voltage VO2. FIG. 15 is a diagram, similar to FIG. 14, showing transitions of currents, voltages and switch elements in the DC-DC converter 150. In a boost period TZ2 in FIG. 15, it is intended that the first and second output voltages VO1 and VO2 both increase, and the difference between the second output voltage VO2 and the target voltage at the beginning of the boost period TZ2 is smaller than the increase of the second output voltage VO2 for a single boost.

In this case, the DC-DC converter 150 performs a feedback control where the pulse width of the control signal VG2 is varied while the control signal VG0 is transitioned at predetermined intervals in order to make the second output voltage VO2 equal to the target voltage. More specifically, the control circuit 151 detects the level of the second output voltage VO2 using detection means (not shown), and reduces the pulse width of the control signal VG2 (see a portion marked "E4" in FIG. 15) if the detected level is close to the target voltage. With this feedback control, if the second output voltage VO2 is close to the target voltage, the ON time of the sub-switch element 152 is shortened to reduce the current flowing through the second output circuit. Therefore, the second output voltage VO2 can be increased in steps smaller than normal.

However, also in the discharge period t5 of the boost period TZ2, the source potential of the sub-switch element 152 is significantly higher than the power source input potential VIN. Therefore, even if the control signal VG2 is transitioned to the H level, the gate potential of the sub-switch element 152 remains higher than the source potential thereof. Thus, the sub-switch element 152 is always in the ON state during the discharge period t5, whereby the increase of the second output voltage VO2 does not change even if the pulse width of the control signal VG2 is reduced. As described above, with the DC-DC converter 150, the ON time of the sub-switch element 152 cannot be made shorter than a single discharge period, whereby the second output voltage VO2 cannot be made equal to the target voltage.

SUMMARY OF THE INVENTION

Therefore, an object of the present invention is to provide a DC-DC converter capable of accurately turning ON/OFF the sub-switch element to output a voltage precisely equal to the target voltage.

The present invention has the following features to attain the object mentioned above.

A DC-DC converter of the present invention includes the following elements, and boosts a voltage supplied from a power source. An inductor receives a power supply from the power source to accumulate an energy therein, produces an induced voltage higher than the supplied voltage, and releases the accumulated energy. A main switch is connected to one end of the inductor for selectively accumulating an energy in the inductor or releasing an energy from the inductor. A main switch control circuit outputs a main switch control signal for switching the main switch between an ON state and an OFF state. An output terminal is a terminal through which a current is passed when the inductor releases an energy to output a boosted voltage. A sub-switch is a switch for selectively passing a current through the output terminal when the inductor releases an energy. An error detection circuit detects a voltage difference between a voltage outputted from the output terminal and a target voltage. An error/pulse conversion circuit outputs a PWM signal having a pulse width according to the voltage difference. A sub-switch control circuit outputs a sub-switch control signal for switching the sub-switch between an ON state and an OFF state based on the PWM signal. A voltage control circuit is provided between the sub-switch control circuit and the sub-switch for controlling a voltage applied to a control terminal of the sub-switch according to the sub-switch control signal.

In a preferred embodiment, the voltage control circuit receives, as a power supply, an output-side potential of the inductor, and applies, to the control terminal of the sub-switch, either the output-side potential of the inductor or a predetermined potential closer to a ground potential with respect to the output-side potential, depending on the sub-switch control signal. In a more preferred embodiment, the voltage control circuit applies, to the control terminal of the sub-switch, the output-side potential of the inductor if the sub-switch control signal indicates the OFF state or the predetermined potential closer to the ground potential with respect to the output-side potential of the inductor if the sub-switch control signal indicates the ON state.

In a preferred embodiment where the sub-switch is a P-channel MOS transistor, the voltage control circuit applies, to a gate of the P-channel MOS transistor, the output-side potential of the inductor if the sub-switch control signal indicates the OFF state or a voltage lower than the output-side potential of the inductor by an amount equal to or greater than a threshold potential of the P-channel MOS transistor if the sub-switch control signal indicates the ON state. In a preferred embodiment, where the sub-switch is an N-channel MOS transistor, the voltage control circuit applies, to a gate of the N-channel MOS transistor, the output-side potential of the inductor if the sub-switch control signal indicates the OFF state or a potential higher than the output-side potential of the inductor by an amount equal to or greater than a threshold voltage of the N-channel MOS transistor if the sub-switch control signal indicates the ON state.

In a preferred embodiment, the main switch is a transistor of a first polarity, and the sub-switch is a transistor of a second polarity opposite to the first polarity.

In a preferred embodiment, the DC-DC converter includes a plurality of sets of the sub-switch, the output terminal, the error detection circuit, the error/pulse conversion circuit and the voltage control circuit. In a preferred embodiment, the sub-switch control circuit limits, to one at most, the number of sub-switch control signals to be outputted simultaneously when the inductor releases an energy. In a preferred embodiment, in a single boost operation, the sub-switch control circuit selects one PWM signal at most from among a plurality of PWM signals outputted from the plurality of error/pulse conversion circuits, and outputs only the selected PWM signal as a valid sub-switch control signal. In a preferred embodiment, in a single boost operation, the sub-switch control circuit selects PWM signals from among a plurality of PWM signals outputted from the plurality of error/pulse conversion circuits, and exclusively outputs the selected PWM signals as valid sub-switch control signals.

In a preferred embodiment, the DC-DC converter further includes: a reverse voltage output terminal, connected to an input side of the inductor, through which a current is passed when the inductor releases an energy to output a voltage boosted in a reverse direction with respect to the voltage outputted from the output terminal; and a reverse voltage switch provided between the power source and the inductor for selectively passing a current through the reverse voltage output terminal when the inductor releases an energy, wherein the main switch control circuit outputs, in addition to the main switch control signal, a control signal for the reverse voltage switch.

With the DC-DC converter of the present invention, the potential applied to the control terminal of the sub-switch is controlled according to the sub-switch control signal, whereby even if the output-side potential of the inductor is higher (or lower) than the power source voltage, the sub-switch can be turned ON/OFF accurately, and the output voltage can be made precisely equal to the target voltage. In addition, the output voltage can be made equal to the target voltage by turning ON/OFF the sub-switch using the sub-switch control signal, which is produced based on the voltage difference between the output voltage and the target voltage.

If a control signal switched between the output-side potential of the inductor and a predetermined potential closer to the ground potential is applied to the control terminal of the sub-switch, it is possible to establish an intended magnitude relationship in the control signal applied between the input terminal of the sub-switch and the control terminal thereof, whereby the sub-switch can be turned ON/OFF accurately.

Moreover, if the DC-DC converter includes a plurality of sets of sub-switches, etc., it is possible to provide a multiple-output DC-DC converter in which a plurality of sub-switches are turned ON/OFF accurately, and a plurality of output voltages can be made precisely equal to their respective target voltages. In such a case, if the number of sub-switches to be in the ON state simultaneously is limited to one at most, it is possible to increase (or decrease) only an intended output voltage. If the number of sub-switch control signals to be indicating the ON state in a single boost operation is limited to one at most, it is possible to increase (or decrease) only an intended output voltage in the single boost operation. By repeating such a boost operation, a plurality of output voltages can be successively made equal to their respective target voltages in an intended order. Alternatively, if a plurality of sub-switch control signals are allowed to indicate the ON state in a single boost operation, a plurality of output voltages can be made equal to their respective target voltages within a short period of time.

Where the DC-DC converter includes the reverse voltage output terminal and the reverse voltage switch, it is possible to obtain an output voltage boosted in the reverse direction.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
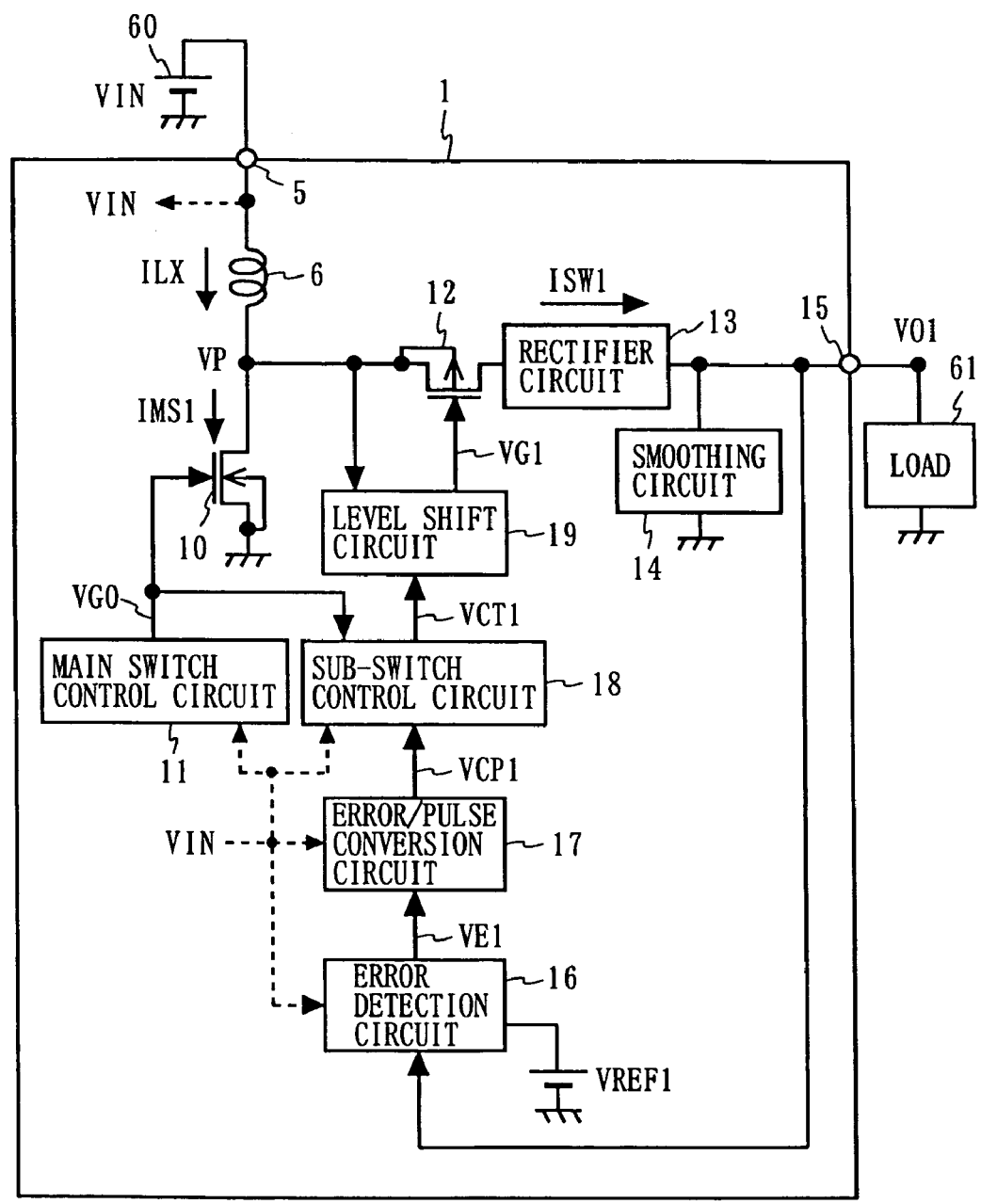
FIG. 1 illustrates a configuration of a DC-DC converter according to a first embodiment of the present invention.

FIG. 1 illustrates a configuration of a DC-DC converter 1 according to the first embodiment of the present invention. Referring to FIG. 1, the DC-DC converter 1 includes an input terminal 5, an inductor 6, a main switch element 10, a main switch control circuit 11, a sub-switch element 12, a rectifier circuit 13, a smoothing circuit 14, an output terminal 15, an error detection circuit 16, an error/pulse conversion circuit 17, a sub-switch control circuit 18 and a level shift circuit 19. During the operation of the DC-DC converter 1, the DC power source 60 is connected to the input terminal 5, and the load 61 to the output terminal 15.

The DC power source 60 provides a DC power source input potential VIN to the DC-DC converter 1. The DC-DC converter 1 boosts the power source input potential VIN supplied from the DC power source 60 to a predetermined level (the target voltage), and outputs an output voltage VO1 through the output terminal 15. The load 61 may be any circuit (e.g., an LCD) connected to the output terminal 15 and driven by the output voltage VO1.

The operation of the DC-DC converter 1 is outlined below. The main switch element 10 is switched between the ON state and the OFF state at predetermined intervals. While the main switch element 10 is in the ON state, the inductor 6 receives a power supply from the DC power source 60 to accumulate an energy therein (charge operation). When the main switch element 10 transitions from the ON state to the OFF state, the inductor 6 releases the accumulated energy (discharge operation). In the discharge period, if the sub-switch element 12 is in the ON state, a current is passed through a circuit downstream of the sub-switch element 12 (hereinafter referred to as the "output circuit") by the energy discharged from the inductor 6, thereby increasing the output voltage VO1. The error detection circuit 16 detects a voltage difference VE1 between the output voltage VO1 and a target voltage VREF1, and the error/pulse conversion circuit 17 outputs a PWM (Pulse Width Modulation) signal VCP1 having a pulse width according to the detected voltage difference VE1. The PWM signal VCP1 is converted to a control signal VCT1 through the sub-switch control circuit 18, and the control signal VCT1 is converted to a control signal VG1 through the level shift circuit 19. The sub-switch element 12 is turned ON/OFF by the obtained control signal VG1. The inductor 6 undergoes the charge and discharge operations repeatedly, and the sub-switch element 12 is controlled to be in the ON state as necessary in the discharge period. Thus, the output voltage VO1 increases stepwise to the target voltage VREF1. A characteristic feature of the DC-DC converter 1 is that it includes the level shift circuit 19 for selectively performing a level shift operation, and applies, to the gate of the sub-switch element 12, either the source potential of the sub-switch element 12 or a potential that is lower than this source potential by a predetermined amount, depending on the control signal VCT1 from the sub-switch control circuit 18, thus turning ON/OFF the sub-switch element 12.

Referring to FIG. 1, the inductor 6 receives a power supply from the DC power source 60 to accumulate an energy therein, and produces an induced voltage higher than the power source input potential VIN based on the accumulated energy. The main switch element 10 is an N-channel MOS transistor. The main switch element 10 is turned ON/OFF by the control signal VG0 applied to the gate thereof to selectively accumulate an energy in the inductor 6 or produce an induced voltage across the inductor 6.

The sub-switch element 12 is a P-channel MOS transistor. The sub-switch element 12 is turned ON/OFF by the control signal VG1 applied to the gate thereof for selectively passing a current to the output circuit. The rectifier circuit 13 is a diode, for example, and rectifies the incoming current. The smoothing circuit 14 removes ripples from the current having passed through the rectifier circuit 13. The current having passed through the smoothing circuit 14 flows into the load 61 via the output terminal 15.

The main switch control circuit 11 turns ON/OFF the main switch element 10, and the sub-switch control circuit 18 turns ON/OFF the sub-switch element 12 via the level shift circuit 19. More specifically, the main switch control circuit 11 receives a power supply from the DC power source 60, and outputs to the main switch element 10 the control signal VG0 being switched between the H level and the L level at predetermined intervals. The main switch element 10 is in the ON state when the control signal VG0 is at the H level and in the OFF state when the control signal VG0 is at the L level. The sub-switch control circuit 18 receives a power supply from the DC power source 60, and outputs the control signal VCT1 based on the PWM signal VCP1 from the error/pulse conversion circuit 17.

The level shift circuit 19 uses, as its power source, the output-side potential VP of the inductor 6 (i.e., the potential at a connecting point between the inductor 6 and the main switch element 10), and obtains the control signal VG1 to be applied to the gate of the sub-switch element 12 based on the control signal VCT1 from the sub-switch control circuit 18. More specifically, the level shift circuit 19 outputs the output-side potential VP of the inductor 6 as the H level of the control signal VG1 when the control signal VCT1 is at the L level, and outputs as the L level of the control signal VG1 a potential (VP−VM) that is lower than the potential VP by a predetermined voltage (VM) when the control signal VCT1 is at the H level. Therefore, if the voltage VM is set to a value equal to or greater than threshold voltage of the sub-switch element 12, the sub-switch element 12 is in the OFF state when the control signal VCT1 is at the L level because the gate potential is equal to the source potential, and in the ON state when the control signal VCT1 is at the H level because the gate potential is lower than the source potential.

Figure 2:
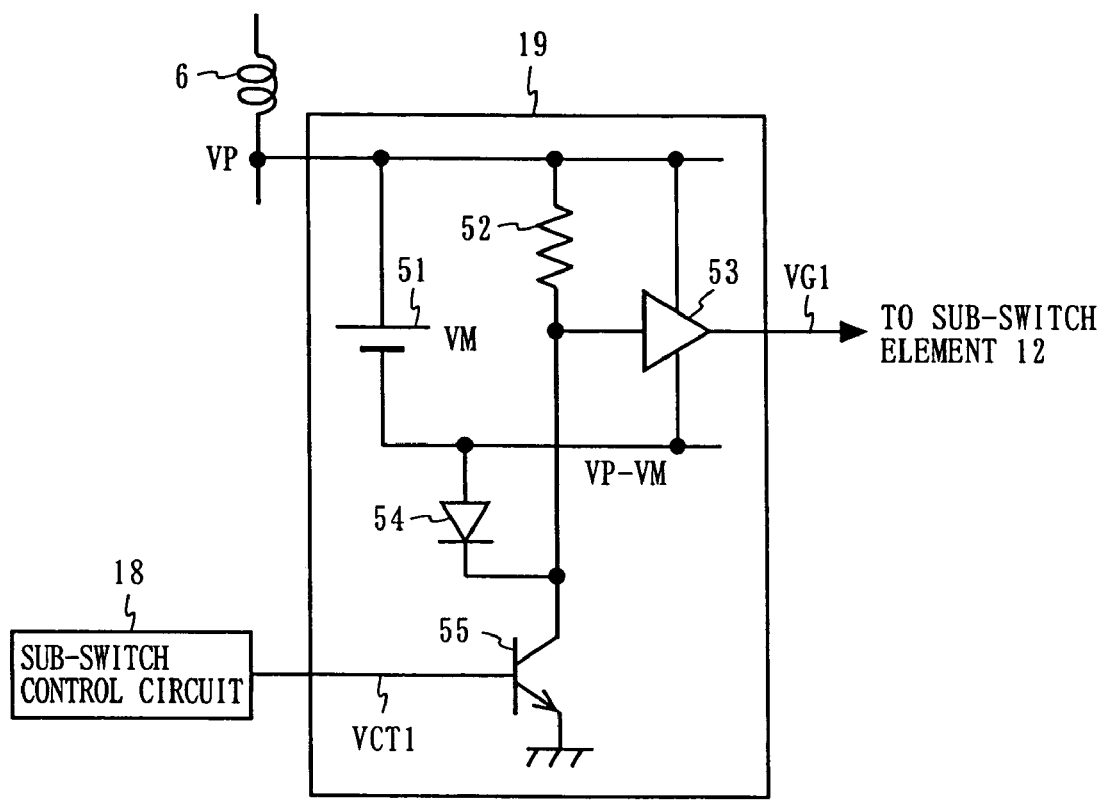
FIG. 2 is a circuit diagram illustrating a detailed configuration of a level shift circuit included in the DC-DC converter of FIG. 1.

FIG. 2 is a circuit diagram illustrating a detailed configuration of the level shift circuit 19. Referring to FIG. 2, the level shift circuit 19 includes a constant voltage power source 51, a resistor 52, a buffer 53, a diode 54 and a bipolar transistor 55. Referring to FIG. 2, the output-side terminal of the inductor 6 is connected to the positive-side terminal of the constant voltage power source 51, one end of the resistor 52 and one of the power source terminals of the buffer 53 to which a higher potential is applied. The negative-side terminal of the constant voltage power source 51 is connected to one of the power source terminals of the buffer 53 to which a lower potential is applied and the anode of the diode 54. The other end of the resistor 52 is connected to the input terminal of the buffer 53, the cathode of the diode 54 and the collector of the bipolar transistor 55. The emitter of the bipolar transistor 55 is grounded, and the base of the bipolar transistor 55 receives the control signal VCT1 from the sub-switch control circuit 18.

The constant voltage power source 51 is a constant voltage circuit for producing the predetermined voltage VM. The constant voltage power source 51 includes a plurality of transistors, and produces the predetermined voltage VM from the current outputted from a constant current source (not shown). The predetermined voltage VM is supplied as a power source voltage between the power source terminals of the buffer 53. The bipolar transistor 55 functions as a switch that is turned ON/OFF based on the control signal VCT1.

If the control signal VCT1 is at the L level, the bipolar transistor 55 is in the OFF state, whereby no current flows through the resistor 52. Therefore, no voltage drop occurs in the resistor 52, whereby the potential at a connecting point between the resistor 52 and the collector of the bipolar transistor 55 is equal to the potential VP. Thus, if the potential VP is higher than the power source input potential VIN, the output of the buffer 53 is at the H level, whereby the H level of the control signal VG1 is equal to the potential VP supplied from one of the power source terminals of the buffer 53 to which a higher potential is applied.

If the control signal VCT1 is at the H level, the bipolar transistor 55 is in the ON state, whereby a current flows through the resistor 52. Therefore, a voltage drop occurs in the resistor 52, whereby the potential at a connecting point between the resistor 52 and the collector of the bipolar transistor 55 is at a level that is lower than the potential VP and close to 0 V. Thus, even if the potential VP is higher than the power source input potential VIN, the output of the buffer 53 is at the L level, whereby the L level of the control signal VG1 is equal to the potential (VP−VM) supplied from one of the power source terminals of the buffer 53 to which a lower potential is applied.

As described above, if the control signal VCT1 is at the L level, the level shift circuit 19 outputs the output-side potential VP of the inductor 6 as it is, whereas if the control signal VCT1 is at the H level, the level shift circuit 19 performs a level shift operation to output the potential (VP−VM) that is lower than the potential VP by a predetermined amount (VM) Therefore, the level of the control signal VG1 is equal to the potential VP if the control signal VCT1 is at the L level, and is lower than the potential VP by a predetermined amount (VM) if the control signal VCT1 is at the H level.

The level shift circuit 19 uses, as its power source, the output-side potential VP of the inductor 6, instead of the power source input potential VIN supplied from the DC power source 60, for the following reason. The sub-switch element 12, being a P-channel MOS transistor, can be turned ON/OFF by switching between a state where the gate potential is substantially equal to the source potential (where the sub-switch element 12 is in the OFF state) and another state where the gate potential is lower than the source potential by an amount equal to or greater than a threshold voltage (where the sub-switch element 12 is in the ON state).

For the purpose of comparison, consider a case where the level shift circuit 19 uses, as its power source, the power source input potential VIN supplied from the DC power source 60, as do the other circuits. Generally, the H level of the control signal VG1 is dictated by the power supplied to the level shift circuit 19, and if the level shift circuit 19 uses the power source input potential VIN as its power source, the H level of the control signal VG1 is equal to the power source input potential VIN. Therefore, if the output-side potential VP of the inductor 6 is higher than the power source input potential VIN, the gate potential of the sub-switch element 12 is lower than the source potential thereof, whereby the sub-switch element 12 does not transition to the OFF state.

In contrast, if the level shift circuit 19 uses the output-side potential VP of the inductor 6 as its power source, the H level of the control signal VG1 is equal to the output-side potential VP of the inductor 6. Therefore, if the control signal VCT1 is at the L level, the gate potential of the sub-switch element 12 is substantially equal to the source potential thereof, whereby the sub-switch element 12 is in the OFF state, even if the output-side potential VP of the inductor 6 is higher than the power source input potential VIN. Thus, if the level shift circuit 19 uses the output-side potential VP of the inductor 6 as its power source, the sub-switch element 12 can be brought to the OFF state as necessary even if the output-side potential VP of the inductor 6 is higher than the power source input potential VIN.

Figure 3:
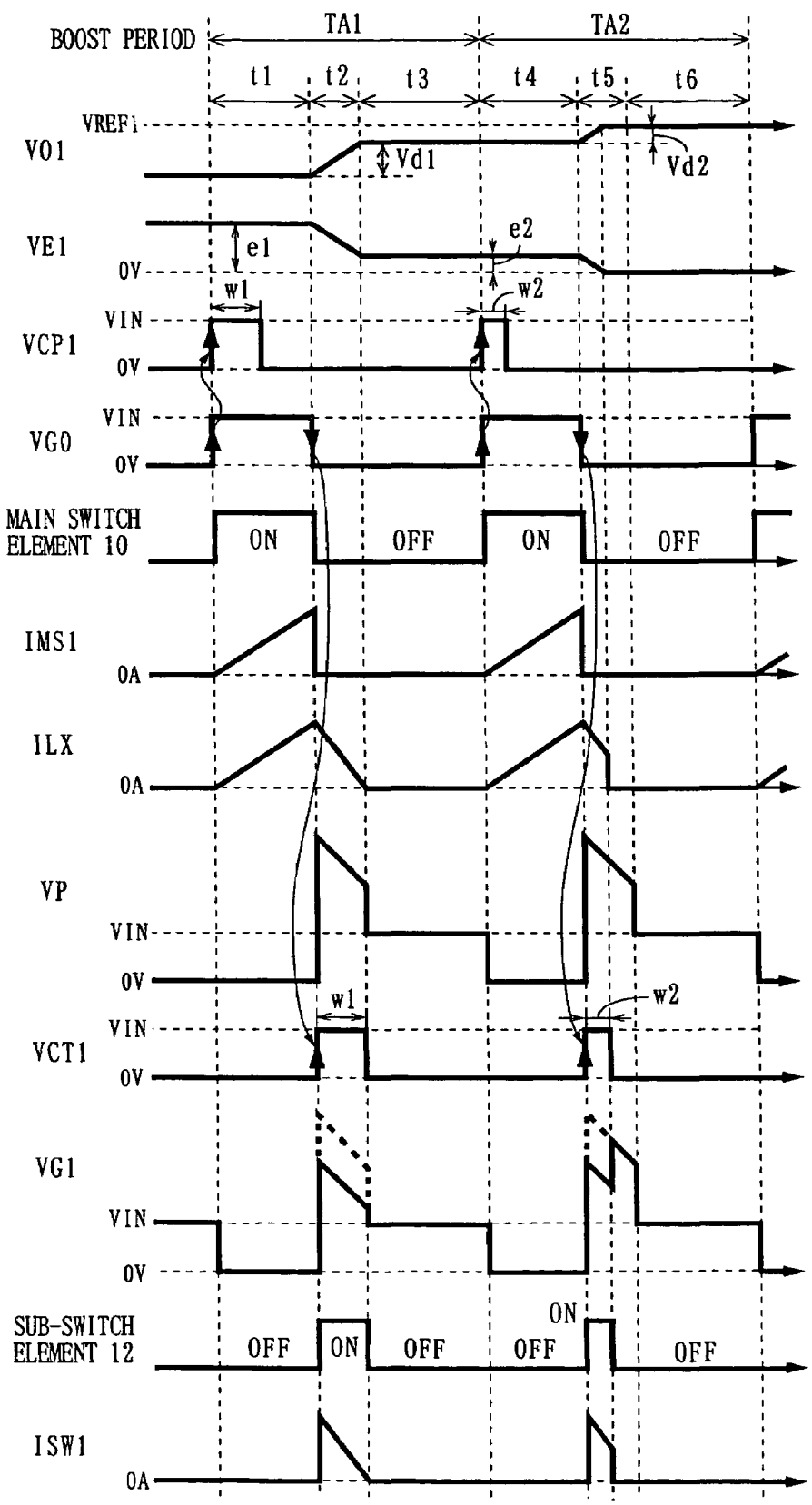
FIG. 3 is a diagram showing transitions of currents, voltages and switch elements in the DC-DC converter of FIG. 1.

FIG. 3 is a diagram showing transitions of currents, voltages and switch elements in the DC-DC converter 1. In FIG. 3, IMS1 denotes the current flowing through the main switch element 10, ILX the current flowing through the inductor 6, and ISW1 the output current of the rectifier circuit 13. The operation of the DC-DC converter 1 in boost periods TA1 and TA2 where VIN<VO1 (e.g., VIN=3 V and VO1=8 V) will now be described.

<Charge Period t1 of Boost Period TA1>

In the charge period, the main switch control circuit 11 outputs the control signal VG1 at the H level. Therefore, the main switch element 10 is in the ON state. Thus, in the charge period, the current ILX flowing through the inductor 6 increases, whereby an energy is accumulated in the inductor 6. Note that in the charge period, the potential VP remains at 0 V. Moreover, in the charge period, the sub-switch control circuit 18 outputs the control signal VCT1 at the L level. Therefore, the level shift circuit 19 does not perform a level shift operation, and the gate potential of the sub-switch element 12 is equal to the source potential thereof, whereby the sub-switch element 12 is in the OFF state.

Moreover, in the charge period, the error detection circuit 16 detects the voltage difference VE1 between the output voltage VO1 and the target voltage VREF1, and the error/pulse conversion circuit 17 produces the PWM signal VCP1 having a pulse width according to the voltage difference VE1. Note however that the pulse width of the PWM signal VCP1 is restricted to be less than or equal to the duration of the discharge period. In the charge period t1 of FIG. 3, the voltage difference VE1 between the output voltage VO1 and the target voltage VREF1 is sufficiently large so that the pulse width of the PWM signal VCP1 is equal to the duration of the discharge period t2.

<Discharge Period t2 of Boost Period TA1>

In the instant the main switch element 10 transitions from the ON state to the OFF state, an induced voltage is produced across the inductor 6 by the energy accumulated in the inductor 6, thereby significantly increasing the potential VP. Thereafter in the discharge period, the inductor 6 releases the accumulated energy. Moreover, being triggered by the falling edge of the control signal VG0 for the main switch element 10 (i.e., starting from the beginning of the discharge period t2), the sub-switch control circuit 18 outputs the control signal VCT1 at the H level for the same duration as the pulse width of the PWM signal VCP1.

Due to the function of the level shift circuit 19, the level of the control signal VG1 is equal to the potential VP when the control signal VCT1 is at the L level, and equal to the potential (VP−VM) when the control signal VCT1 is at the H level. The sub-switch element 12, being a P-channel MOS transistor, is in the ON state when the gate potential is lower than the source potential by an amount equal to or greater than a threshold voltage. Therefore, when the control signal VCT1 is at the L level, the sub-switch element 12 is in the OFF state since the gate potential and the source potential thereof are both equal to the potential VP. When the control signal VCT1 is at the H level, the sub-switch element 12 is in the ON state since the source potential thereof is equal to the potential VP and the gate potential thereof is equal to the potential (VP−VM) lower than the source potential.

Therefore, while the control signal VCT1 is at the H level in the discharge period, a current is passed through the output circuit by the energy released from the inductor 6, thereby increasing the output voltage VO1. The current ISW1 having passed through the sub-switch element 12 is rectified by the rectifier circuit 13 and smoothed by the smoothing circuit 14, whereby the output voltage VO1 increases smoothly in the discharge period.

As described above, the pulse width of the PWM signal VCP1 obtained in the charge period t1 of FIG. 3 is equal to the duration of the discharge period t2. Therefore, throughout the discharge period t2, the control signal VCT1 is at the H level and the sub-switch element 12 is in the ON state. Thus, a predetermined amount of current is passed through the output circuit by the energy released from the inductor 6, thereby increasing the output voltage VO1 by a predetermined amount (Vd1).

<Stand-By Period t3 of Boost Period TA1>

When the accumulated energy is completely released from the inductor 6, the potential VP decreases to the power source input potential VIN. Thereafter, no current or voltage transition occurs in the DC-DC converter 1 until the control signal VG0 is brought to the H level again. In the stand-by period, the main switch control circuit 11 outputs the control signal VG0 at the L level, and the sub-switch control circuit 18 outputs the control signal VCT1 at the L level. Therefore, the main switch element 10 and the sub-switch element 12 are both in the OFF state. Thus, in the boost period TA1, the output voltage VO1 increases by Vd1.

<Charge Period t4 of Boost Period TA2>

In the charge period t4, the DC-DC converter 1 performs the same operation as that in the charge period t1. Note however that in the charge period t4, the voltage difference VE1 between the output voltage VO1 and the target voltage VREF1 is smaller than the increase Vd1 of the output voltage VO1 for a single boost. In such a case, the pulse width of the PWM signal VCP1 is shorter than the duration of the discharge period t5.

<Discharge Period t5 of Boost Period TA2>

Since the pulse width of the PWM signal VCP1 is shorter than the duration of the discharge period t5, in the discharge period t5, the sub-switch control circuit 18 is triggered by the falling edge of the control signal VG0 for the main switch element 10 to output the control signal VCT1 at the H level for the same duration as the pulse width of the PWM signal VCP1, after which the sub-switch control circuit 18 outputs the control signal VCT1 at the L level. Hereinafter, a portion of the discharge period t5 in which the control signal VCT1 is at the H level will be referred to as the "first half" and the rest of the discharge period t5 as the "second half".

In the first half of the discharge period t5, the operation of the DC-DC converter 1 is the same as that in the discharge period t2. Therefore, in the first half, the sub-switch element 12 is in the ON state, and a predetermined amount of current is passed through the output circuit by the energy released from the inductor 6, thereby increasing the output voltage VO1 by a predetermined amount (Vd2). Note however that since the amount of current flowing through the output circuit in the first half is smaller than that in the discharge period t2, the increase Vd2 of the output voltage VO1 in the first half is smaller than the increase Vd1 of the output voltage VO1 in the discharge period t2.

As the control signal VCT1 transitions from the H level to the L level, the level shift circuit 19 stops performing the level shift operation. Therefore, as the control signal VCT1 transitions from the H level to the L level, the level of the control signal VG1 transitions from the potential (VP−VM) to the potential VP. Therefore, in the second half of the discharge period t5, the sub-switch element 12 is in the OFF state since the gate potential thereof is equal to the source potential thereof, whereby the output voltage VO1 does not change. Thereafter, when the accumulated energy is completely released from the inductor 6, the potential VP decreases to the power source input potential VIN.

<Stand-By Period t6 of Boost Period TA2>

In the stand-by period t6, the operation of the DC-DC converter 1 is the same as that in the stand-by period t3. Thus, in the boost period TA2, the output voltage VO1 increases by the amount Vd2, which is smaller than the amount Vd1 by which the output voltage VO1 increases in the boost period TA1. Therefore, with the DC-DC converter 1, the output voltage VO1 can be made precisely equal to the target voltage by adjusting the increase of the output voltage VO1.

Figure 13:
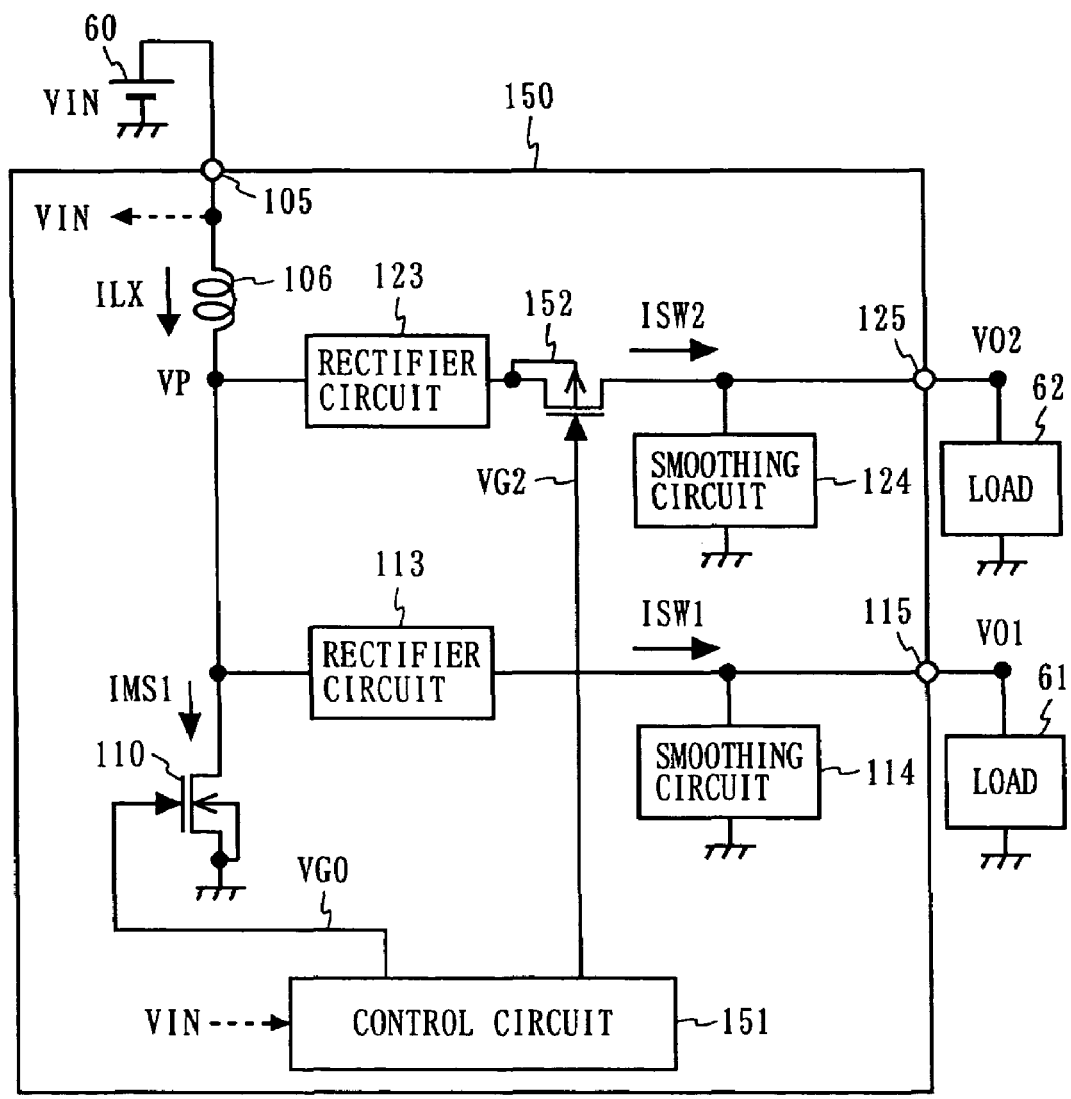
FIG. 13 illustrates a second configuration of the conventional DC-DC converter.
Figure 14:
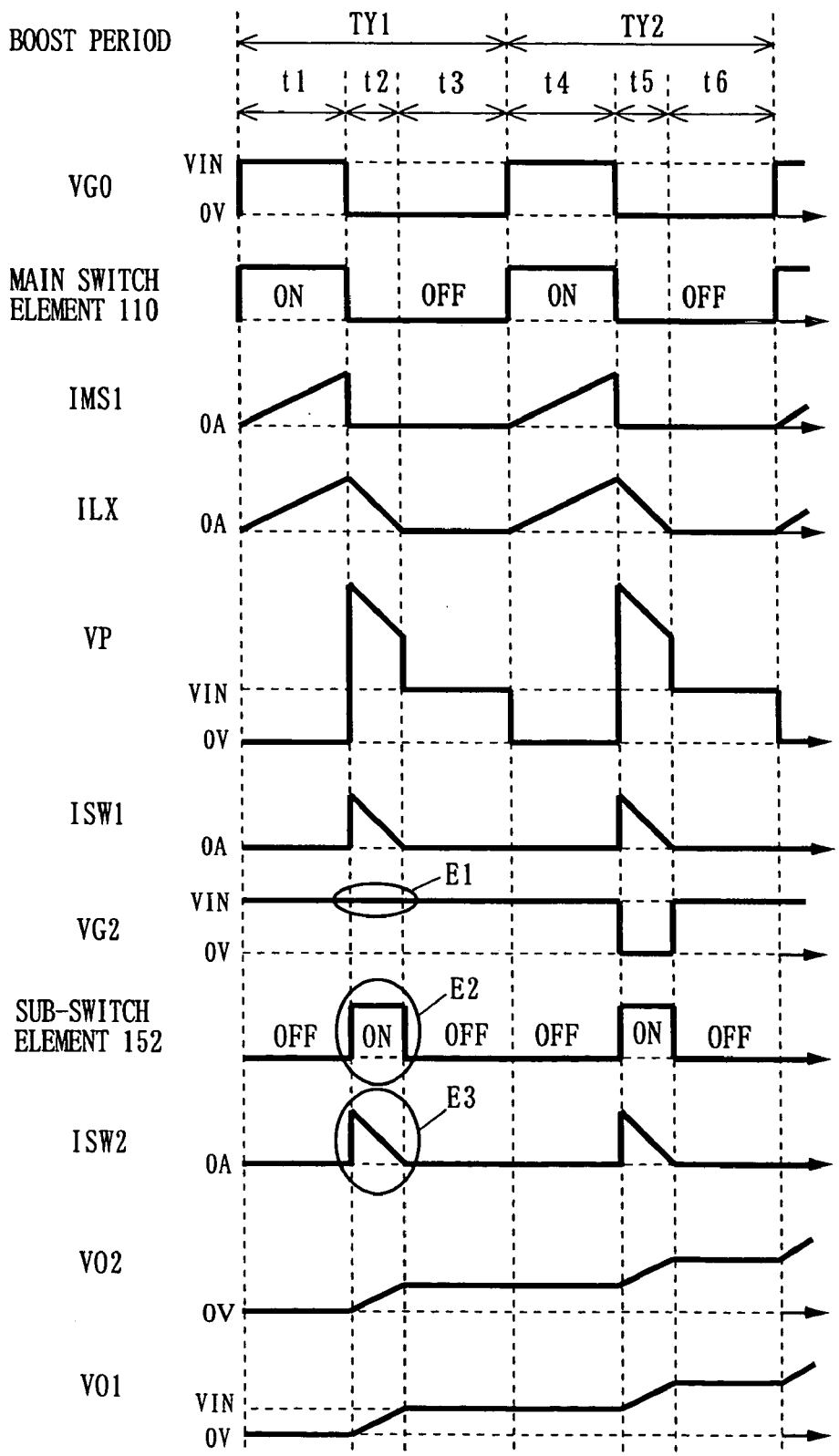
FIG. 14 is a diagram showing transitions of currents, voltages and switch elements in the DC-DC converter of FIG. 13.
Figure 15:
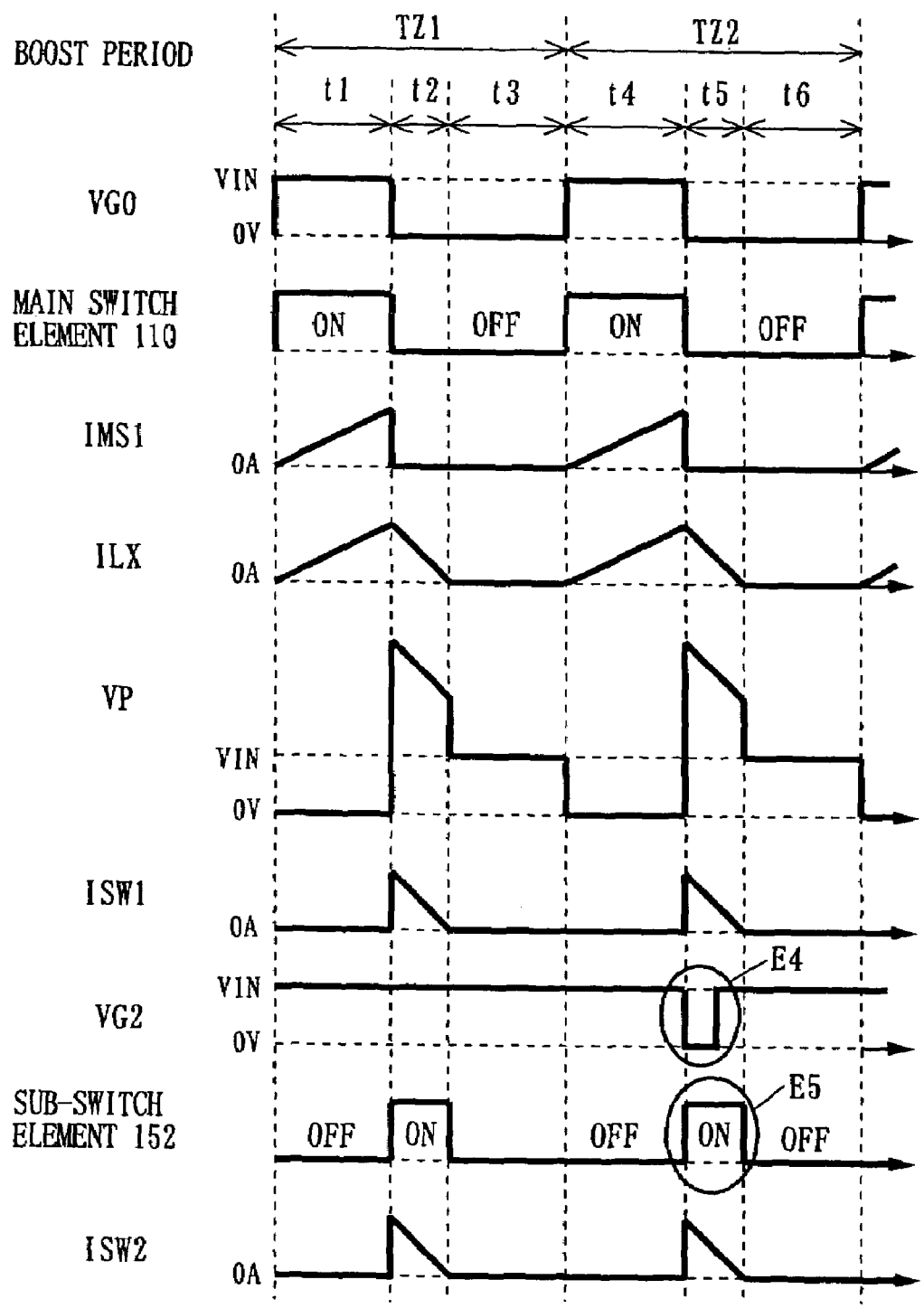
FIG. 15 is a diagram showing transitions of currents, voltages and switch elements in the DC-DC converter of FIG. 13.

The advantageous effects of the DC-DC converter 1 will now be discussed in comparison with the conventional DC-DC converter 150 (FIG. 13). With the DC-DC converter 150, in the second half of the discharge period t5 of the boost period TZ2 shown in FIG. 15, the control signal VG2 applied to the gate of the sub-switch element 152 is controlled to be at the H level (the power source input potential VIN) in order to turn OFF the sub-switch element 152. However, in the discharge period, the source potential of the sub-switch element 152 is significantly higher than the power source input potential VIN due to the induced voltage of the inductor 6. Therefore, even though the control signal VG2 is controlled to be at the H level, the sub-switch element 122 is always in the ON state in the discharge period since the gate potential of the sub-switch element 152 is lower than the source potential thereof. Thus, with the conventional DC-DC converter 150, since the ON/OFF function of the sub-switch element 152 is disabled, the output voltage VO1 cannot be made equal to the target voltage.

In contrast, the DC-DC converter 1 includes the level shift circuit 19 for selectively performing a level shift operation, and applies, to the gate of the sub-switch element 12, the source potential VP of the sub-switch element 12 or the potential (VP−VM) lower than this source potential according to the control signal VCT1 from the sub-switch control circuit 18. Therefore, if the control signal VCT1 is controlled to be at the L level in the second half of the discharge period, the gate potential of the sub-switch element 12 can be made equal to the source potential thereof even if the source potential of the sub-switch element 12 is significantly higher than the power source input potential VIN. Therefore, in the second half of the discharge period, the sub-switch element 12 is in the OFF state, and the output voltage VO1 does not increase. Thus, with the DC-DC converter 1, the sub-switch element 12 can be turned ON/OFF accurately, and the output voltage VO1 can be made precisely equal to the target voltage.

(Second Embodiment)

Figure 4:
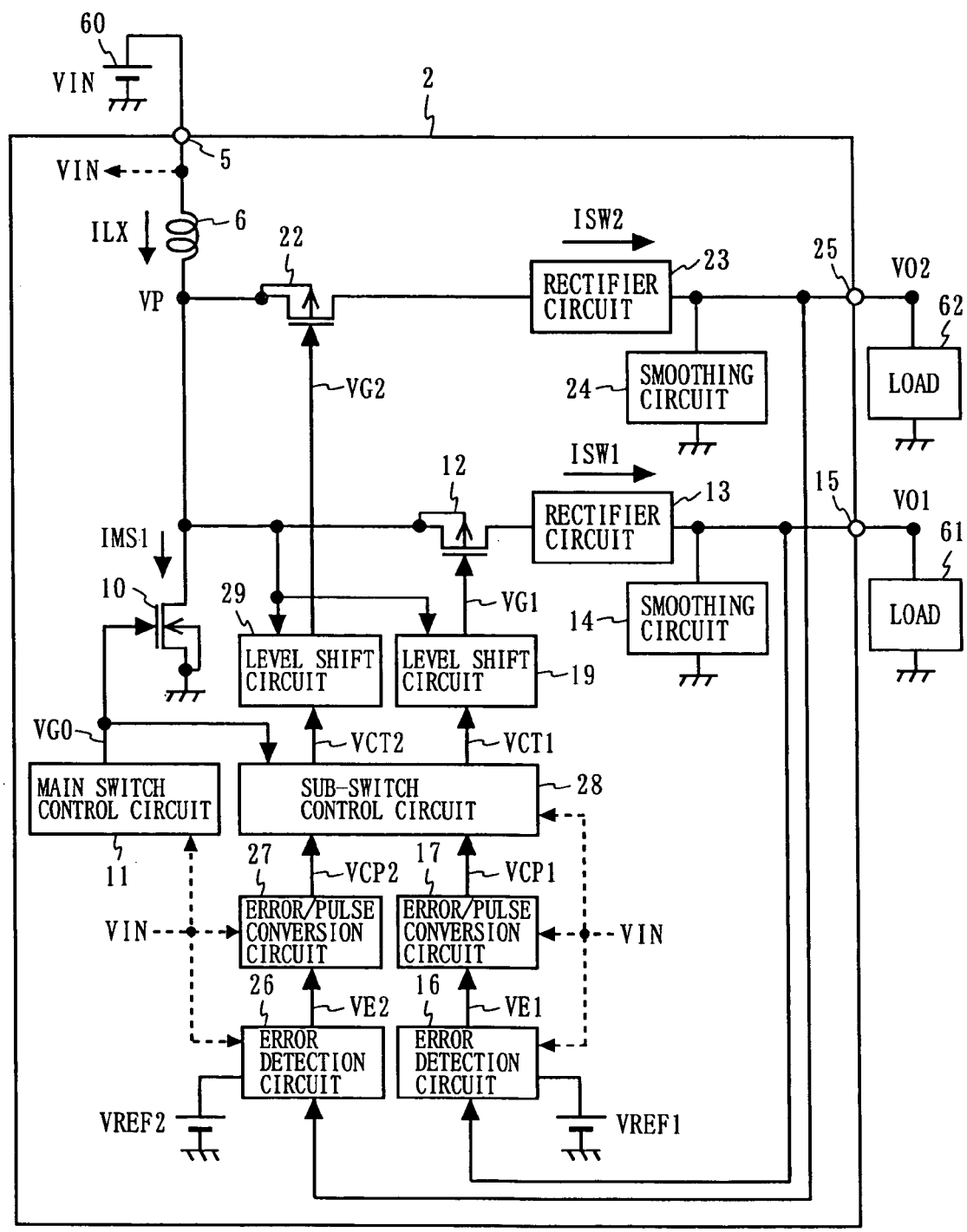
FIG. 4 illustrates a configuration of a DC-DC converter according to a second embodiment of the present invention.

FIG. 4 illustrates a configuration of a DC-DC converter 2 according to the second embodiment of the present invention. Referring to FIG. 4, the DC-DC converter 2 includes the input terminal 5, the inductor 6, the main switch element 10, the main switch control circuit 11, sub-switch elements 12 and 22, rectifier circuits 13 and 23, smoothing circuits 14 and 24, output terminals 15 and 25, error detection circuits 16 and 26, error/pulse conversion circuits 17 and 27, a sub-switch control circuit 28 and level shift circuits 19 and 29. During the operation of the DC-DC converter 2, the DC power source 60 is connected to the input terminal 5, and loads 61 and 62 to the output terminals 15 and 25, respectively. In the present embodiment, like elements to those of the first embodiment will be denoted by like reference numerals and will not be further described below.

Referring to FIG. 4, the sub-switch element 12, the rectifier circuit 13, the smoothing circuit 14, the output terminal 15 and the level shift circuit 19 together function as a first output circuit, and the sub-switch element 22, the rectifier circuit 23, the smoothing circuit 24, the output terminal 25 and the level shift circuit 29 together function as a second output circuit. The second output circuit has the same configuration and the same function as those of the first output circuit. The DC-DC converter 2 boosts the power source input potential VIN supplied from the DC power source 60 with the single inductor 6, and outputs the first output voltage VO1 through the output terminal 15 and the second output voltage VO2 through the output terminal 25.

The error detection circuit 26 and the error/pulse conversion circuit 27 are similar in operation to the error detection circuit 16 and the error/pulse conversion circuit 17, respectively. Specifically, the error detection circuit 26 detects a voltage difference VE2 between the second output voltage VO2 from the output terminal 25 and a target voltage VREF2, and the error/pulse conversion circuit 27 outputs a PWM signal VCP2 having a pulse width according to the voltage difference VE2. The load 62 may be any circuit connected to the output terminal 25 and driven by the second output voltage VO2.

The sub-switch control circuit 28 receives a power supply from the DC power source 60 to output control signals VCT1 and VCT2 based on the PWM signals VCP1 and VCP2 and the control signal VG0 from the main switch control circuit 11. Note however that the sub-switch control circuit 28 functions so that the number of control signals (among the control signals VCT1 and VCT2) to be at the H level simultaneously is limited to one at most. Specifically, the control signal VCT2 is controlled to be at the L level while the control signal VCT1 is at the H level, and the control signal VCT1 is controlled to be at the L level while the control signal VCT2 is at the H level.

The level shift circuit 29 is similar in operation to the level shift circuit 19. Specifically, the level shift circuit 29 outputs the potential VP as the control signal VG2 when the control signal VCT2 is at the L level, and outputs the potential (VP−VM) as the control signal VG2 when the control signal VCT2 is at the H level. Therefore, the sub-switch element 22 is in the OFF state when the control signal VCT2 is at the L level, and in the ON state when the control signal VCT2 is at the H level.

The DC-DC converter 2 increases the first and second output voltages VO1 and VO2 based on a principle similar to that for the DC-DC converter 1 of the first embodiment. Note however that the DC-DC converter 2 preferentially increases one of the first and second output voltages VO1 and VO2 in each boost period. In the present embodiment, a boost period during which the first output voltage VO1 is preferentially increased will be referred to as a "type-1 boost period", and a boost period during which the second output voltage VO2 is preferentially increased a"type-2 boost period". In the DC-DC converter 2, type-1 and type-2 boost periods alternate with each other.

In the discharge period included in a type-1 boost period, the sub-switch control circuit 18 is triggered by the falling edge of the control signal VG0 for the main switch element 10 to output the control signal VCT1 at the H level based on the PWM signal VCP1, and outputs the control signal VCT2 at the H level based on the PWM signal VCP2 for the rest of the discharge period. Therefore, in the discharge period included in a type-1 boost period, if the pulse width of the PWM signal VCP1 is equal to the duration of the discharge period, the control signal VCT1 is at the H level and the control signal VCT2 is at the L level. If the pulse width of the PWM signal VCP1 is shorter than the duration of the discharge period, the control signal VCT1 is at the H level and the control signal VCT2 is at the L level first in the discharge period, and then the control signal VCT2 transitions to the H level after the control signal VCT1 transitions to the L level.

The operation is reversed from above in the discharge period included in a type-2 boost period. Specifically, the sub-switch control circuit 18 is triggered by the falling edge of the control signal VG0 for the main switch element 10 to output the control signal VCT2 at the H level based on the PWM signal VCP2, and outputs the control signal VCT1 at the H level based on the PWM signal VCP1 for the rest of the discharge period. Therefore, in the discharge period included in a type-2 boost period, if the pulse width of the PWM signal VCP2 is equal to the duration of the discharge period, the control signal VCT2 is at the H level and the control signal VCT1 is at the L level. If the pulse width of the PWM signal VCP2 is shorter than the duration of the discharge period, the control signal VCT2 is at the H level and the control signal VCT1 is at the L level first, and then the control signal VCT1 transitions to the H level after the control signal VCT2 transitions to the L level. In either case, the total time of the period in which the control signal VCT1 is at the H level and the period in which the control signal VCT2 is at the H level is equal to or shorter than the duration of the discharge period.

Figure 5:
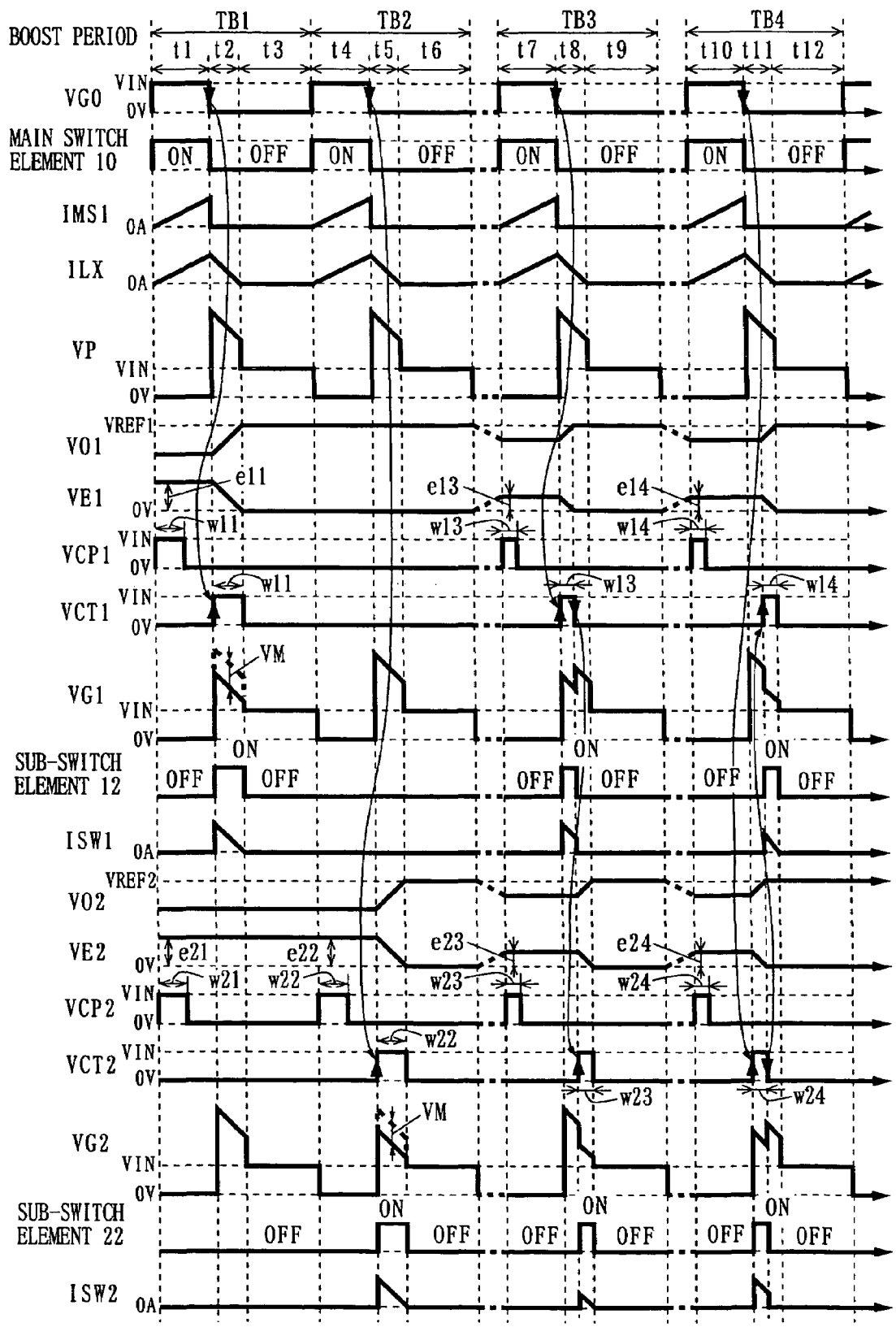
FIG. 5 is a diagram showing transitions of currents, voltages and switch elements in the DC-DC converter of FIG. 4.

FIG. 5 is a diagram showing transitions of currents, voltages and switch elements in the DC-DC converter 2. In FIG. 5, ISW2 denotes the output current from the rectifier circuit 23. The operation of the DC-DC converter 2 in the boost periods TB1 to TB4 will now be described, assuming that VIN<VO1<VO2 (e.g., VIN=3 V, VO1=4 V and VO2=8 V), the boost periods TB1 and TB3 are type-1 boost periods, and the boost periods TB2 and TB4 are type-2 boost periods.

<Charge Period t1 of Boost Period TB1>

In the charge period, the operation of the DC-DC converter 2 is the same as that of the DC-DC converter 1 of the first embodiment, except as follows. With the DC-DC converter 2, the PWM signal VCP1 having a pulse width according to the voltage difference VE1 between the first output voltage VO1 and the target voltage VREF1 is produced by the error detection circuit 16 and the error/pulse conversion circuit 17, and the PWM signal VCP2 having a pulse width according to the voltage difference VE2 between the second output voltage VO2 and the target voltage VREF2 is produced by the error detection circuit 26 and the error/pulse conversion circuit 27.

It is assumed that in the charge period t1, the voltage differences VE1 and VE2 are both sufficiently large, and the pulse widths of the PWM signals VCP1 and VCP2 are both equal to the duration of the discharge period t2.

<Discharge Period t2 of Boost Period TB1>

In the discharge period, the operation of the DC-DC converter 2 is the same as that of the DC-DC converter 1 of the first embodiment, except as follows. With the DC-DC converter 2, in the discharge period included in a type-1 boost period, the sub-switch control circuit 28 is triggered by the falling edge of the control signal VG0 for the main switch element 10 to output the control signal VCT1 at the H level based on the PWM signal VCP1, and outputs the control signal VCT2 at the H level based on the PWM signal VCP2 for the rest of the discharge period. In the discharge period included in a type-2 boost period, the sub-switch control circuit 28 is triggered by the falling edge of the control signal VG0 for the main switch element 10 to output the control signal VCT2 at the H level based on the PWM signal VCP2, and outputs the control signal VCT1 at the H level based on the PWM signal VCP1 for the rest of the discharge period.

The boost period TB1 is a type-1 boost period, and the pulse width of the PWM signal VCP1 obtained in the charge period t1 is equal to the duration of the discharge period t2. Therefore, throughout the discharge period t2, the control signal VCT1 is at the H level, the control signal VCT2 is at the L level, the sub-switch element 12 is in the ON state, and the sub-switch element 22 is in the OFF state. Thus, a current is passed through the first output circuit by the energy released from the inductor 6, thereby increasing the first output voltage VO1 by a predetermined amount. In the meantime, no current is passed through the second output circuit, and the second output voltage VO2 does not increase.

<Stand-By Period t3 of Boost Period TB1>

In the stand-by period, the operation of the DC-DC converter 2 is the same as that of the DC-DC converter 1 of the first embodiment. Thus, in the boost period TB1, only the first output voltage VO1 increases. Note that the operation of the DC-DC converter 2 is the same for all stand-by periods, and will not be further described below.

<Charge Period t4 of Boost Period TB2>

It is assumed that in the charge period t4, the voltage difference VE2 is sufficiently large while the voltage difference VE1 is 0 V. In such a case, while the pulse width of the PWM signal VCP2 is equal to the duration of the discharge period t5, the PWM signal VCP1 will have no pulse thereon.

<Discharge Period t5 of Boost Period TB2>

The boost period TB2 is a type-2 boost period, and the pulse width of the PWM signal VCP2 obtained in the charge period t4 is equal to the duration of the discharge period t5. Therefore, throughout the discharge period t5, the control signal VCT1 is at the L level, the control signal VCT2 is at the H level, the sub-switch element 12 is in the OFF state, and the sub-switch element 22 is in the ON state. Thus, a current is passed through the second output circuit by the energy released from the inductor 6, thereby increasing the second output voltage VO2 by a predetermined amount. In the meantime, no current is passed through the first output circuit, and the first output voltage VO1 does not increase. Thus, in the boost period TB2, only the second output voltage VO2 increases.

<Charge Period t7 of Boost Period TB3>

It is assumed that in the beginning of the boost period TB3, the first and second output voltages are slightly lower than their respective target voltages, and the voltage difference VE1 obtained in the charge period t7 is smaller than the increase of the first output voltage VO1 for a single boost. In such a case, the pulse width of the PWM signal VCP1 is shorter than the duration of the discharge period t8.

<Discharge Period t8 of Boost Period TB3>

The boost period TB3 is a type-1 boost period, and the pulse width of the PWM signal VCP1 obtained in the charge period t7 is shorter than the duration of the discharge period t8. Therefore, in the beginning of the discharge period t8, the control signal VCT1 is at the H level, and the sub-switch element 12 is in the ON state, for the same duration as the pulse width of the PWM signal VCP1. Then, for the same duration as the pulse width of the PWM signal VCP2 after the control signal VCT1 transitions to the L level, the control signal VCT2 is at the H level, and the sub-switch element 22 is in the ON state. Therefore, in the discharge period t8, the first output voltage VO1 first increases by an amount corresponding to the pulse width of the PWM signal VCP1, and then the second output voltage VO2 increases by an amount corresponding to the pulse width of the PWM signal VCP2. Thus, in the boost period TB3, the first and second output voltages VO1 and VO2 both increase.

<Charge Period t10 of Boost Period TB4>

It is assumed that in the beginning of the boost period TB4, the first and second output voltages are slightly lower than their respective target voltages, and the voltage difference VE2 obtained in the charge period t10 is smaller than the increase of the second output voltage VO2 for a single boost. In such a case, the pulse width of the PWM signal VCP2 is shorter than the duration of a discharge period t11.

<Discharge Period t11 of Boost Period TB4>

The operation of the DC-DC converter 2 in the discharge period t11 is reversed with respect to that in the discharge period t8. Specifically, in the beginning of the discharge period t11, the control signal VCT2 is at the H level, and the sub-switch element 22 is in the ON state, for the same duration as the pulse width of the PWM signal VCP2. Then, for the same duration as the pulse width of the PWM signal VCP1 after the control signal VCT2 transitions to the L level, the control signal VCT1 is at the H level, and the sub-switch element 12 is in the ON state. Therefore, in the discharge period t11, the second output voltage VO2 first increases by an amount corresponding to the pulse width of the PWM signal VCP2, and then the first output voltage VO1 increases by an amount corresponding to the pulse width of the PWM signal VCP1. Thus, in the boost period TB4, the first and second output voltages VO1 and VO2 both increase.

As described above, with the DC-DC converter 2, the first and second output voltages VO1 and VO2 can be made precisely equal to their respective target voltages by independently adjusting the increase of each of the first and second output voltages VO1 and VO2. Thus, similar advantageous effects to those of the DC-DC converter of the first embodiment can be realized also with a multiple-output DC-DC converter.

Note that while the two types of boost periods alternate with each other in the DC-DC converter 2, they may in other embodiments appear in any other suitable order as long as the first and second output voltages VO1 and VO2 can be increased to their respective target voltages within a predetermined amount of time. For example, a pattern in which a single type-1 boost period is followed by two consecutive type-2 boost periods may be used, or type-1 boost periods may be repeated a number of times followed by type-2 boost periods repeated a number of times.

While the DC-DC converter 2 as described above increases the second output voltage VO2 in the remaining portion of a type-1 boost period and the first output voltage VO1 in the remaining portion of a type-2 boost period, the DC-DC converter 2 may in other embodiments increase only the first output voltage VO1 throughout a type-1 boost period and only the second output voltage VO2 throughout a type-2 boost period.

While the DC-DC converter 2 as described above outputs two voltages, the DC-DC converter 2 may in other embodiments output three or more voltages by using as many sub-switch elements and output circuits as necessary and by selecting one of three or more sub-switch elements.

(Third Embodiment)

Figure 6:
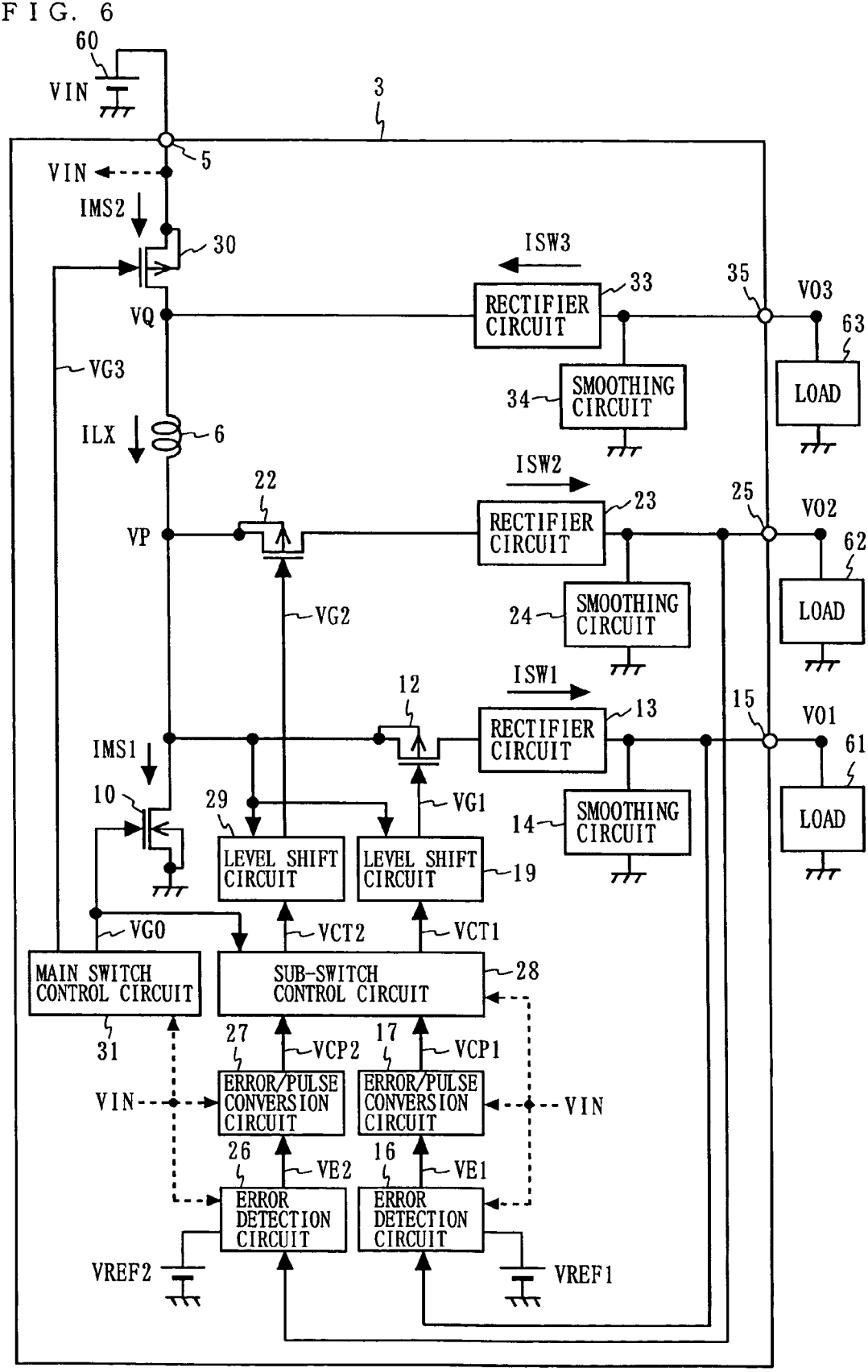
FIG. 6 illustrates a configuration of a DC-DC converter according to a third embodiment of the present invention.

FIG. 6 illustrates a configuration of a DC-DC converter 3 according to the third embodiment of the present invention. Referring to FIG. 6, the DC-DC converter 3 includes the input terminal 5, the inductor 6, main switch elements 10 and 30, a main switch control circuit 31, the sub-switch elements 12 and 22, rectifier circuits 13, 23 and 33, smoothing circuits 14, 24 and 34, output terminals 15, 25 and 35, the error detection circuits 16 and 26, the error/pulse conversion circuits 17 and 27, the sub-switch control circuit 28 and the level shift circuits 19 and 29. During the operation of the DC-DC converter 3, the DC power source 60 is connected to the input terminal 5, and loads 61 to 63 to the output terminals 15, 25 and 35, respectively. In the present embodiment, like elements to those of the first and second embodiments will be denoted by like reference numerals and will not be further described below.

In the DC-DC converter 3, the first and second output circuits include the same elements as those in the DC-DC converter 2 of the second embodiment. In addition, the rectifier circuit 33, the smoothing circuit 34 and the output terminal 35 together function as a third output circuit. The DC-DC converter 3 boosts the power source input potential VIN supplied from the DC power source 60 with a single inductor, and outputs first to third output voltages VO1 to VO3 from the first to third output circuits, respectively. Note however that while the first and second output voltages VO1 and VO2 are positive voltages, the third output voltage VO3 is a negative voltage.

The main switch element 30 is provided between the input terminal 5 and the inductor 6, and functions as a second main switch element. The main switch element 30 is a P-channel MOS transistor. The main switch element 30 is turned ON/OFF by a control signal VG3 applied to the gate thereof for selectively supplying a power to circuits downstream thereof, and for selectively passing a current through the third output circuit.

Unlike the first and second output circuits, the third output circuit is provided closer to the main switch element 30 with respect to the inductor 6. The rectifier circuit 33, the smoothing circuit 34 and the output terminal 35 are similar in function to the rectifier circuit 13, the smoothing circuit 14 and the output terminal 15, respectively. Note however that the rectifier circuit 33 passes a current ISW3 only in a direction (indicated by an arrow in FIG. 6) from the output terminal 35 toward a connecting point between the inductor 6 and the main switch element 30. The load 63 maybe any circuit connected to the output terminal 35 and driven by the third output voltage VO3.

The main switch control circuit 31 turns ON/OFF the main switch elements 10 and 30. More specifically, the main switch control circuit 31 receives a power supply from the DC power source 60 to output two control signals VG0 and VG3, which are each switched between the H level and the L level at predetermined intervals. The main switch element 10 is in the ON state when the control signal VG0 is at the H level and in the OFF state when the control signal VG0 is at the L level. The main switch element 30 is in the OFF state when the control signal VG3 is at the H level and in the ON state when the control signal VG3 is at the L level.

The DC-DC converter 3 increases the first and second output voltages VO1 and VO2 stepwise based on a principle similar to that for the DC-DC converter 2 of the second embodiment. In addition, the DC-DC converter 3 decreases the third output voltage VO3 stepwise. In the present embodiment, a boost period during which the first output voltage VO1 is preferentially increased will be referred to as a "type-1 boost period", a boost period during which the second output voltage VO2 is preferentially increased a "type-2 boost period", and a boost period during which only the third output voltage VO3 is decreased a "type-3 boost period". In the DC-DC converter 3, type-1 to type-3 boost periods may alternate with one another, for example.

Figure 7:
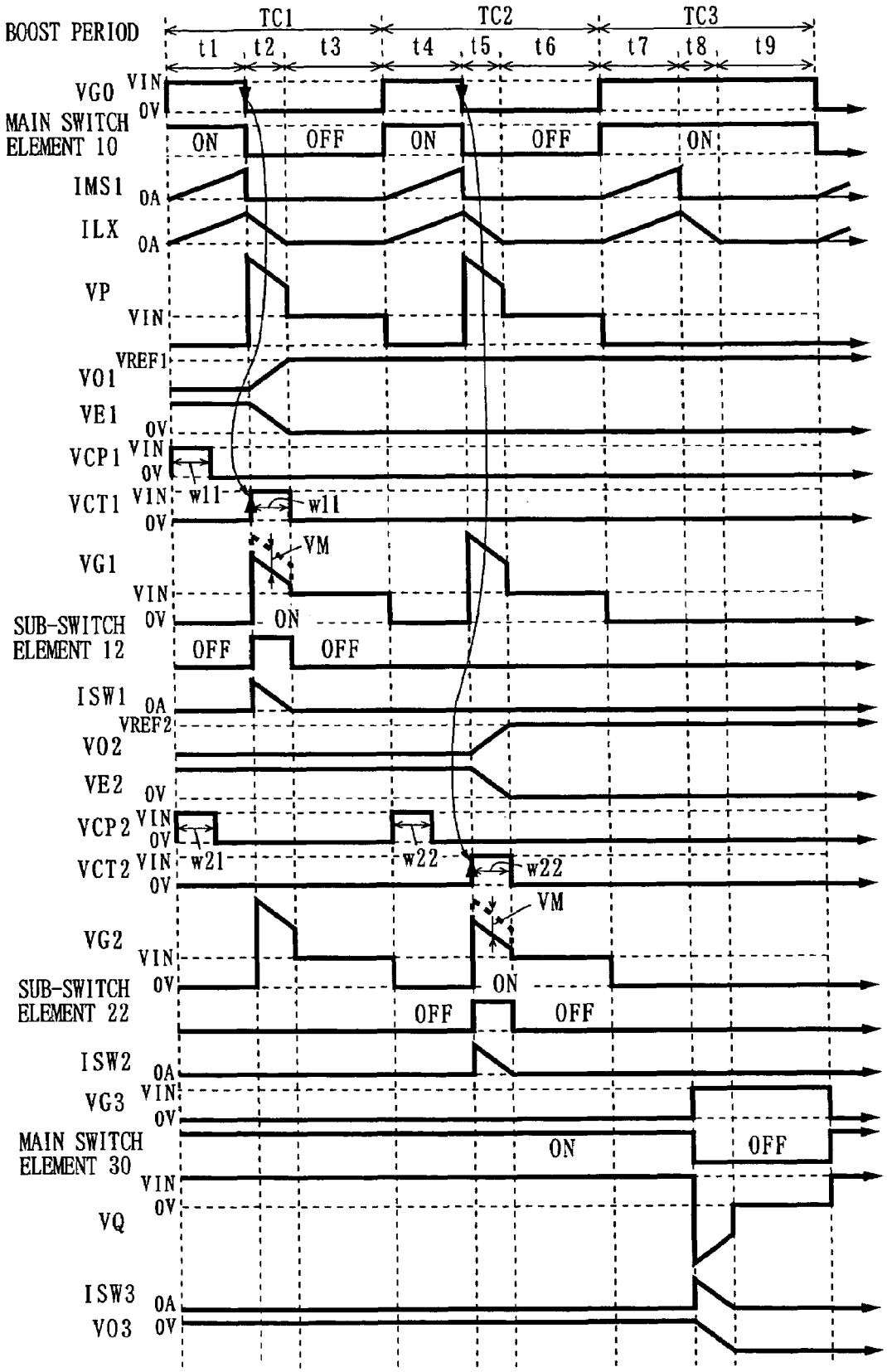
FIG. 7 is a diagram showing transitions of currents, voltages and switch elements in the DC-DC converter of FIG. 6.

FIG. 7 is a diagram showing transitions of currents, voltages and switch elements in the DC-DC converter 3. In FIG. 7, IMS2 denotes the current flowing into the main switch element 30, and ISW3 the output current of the rectifier circuit 33. VQ denotes the input-side potential of the inductor 6 (i.e., the potential at a connecting point between the inductor 6 and the main switch element 30). The operation of the DC-DC converter 3 in boost periods TC1 to TC3 will now be described, assuming that VO3<0 V<VIN<VO1<VO2 (e.g., VIN=3 V, VO1=4 V, VO2=8 V and VO3=−2 V), the boost period TC1 to TC3 are type-1 to type-3 boost periods, respectively.

<Boost Periods TC1 and TC2>

In a type-1 or type-2 boost period, the main switch control circuit 31 outputs the control signal VG3 at the L level. Therefore, in a type-1 or type-2 boost period, the main switch element 30 is in the ON state, and the operation of the DC-DC converter 3 is the same as that of the DC-DC converter 2 of the second embodiment. Therefore, in the discharge period of a type-1 boost period, the first output voltage VO0 first increases by an amount corresponding to the pulse width of the PWM signal VCP1, after which the second output voltage VO2 increases by an amount corresponding to the pulse width of the PWM signal VCP2 in the remaining portion of the discharge period. In the discharge period of a type-2 boost period, the second output voltage VO2 first increases by an amount corresponding to the pulse width of the PWM signal VCP2, after which the first output voltage VO1 increases by an amount corresponding to the pulse width of the PWM signal VCP1 in the remaining portion of the discharge period.

Note that in a type-1 or type-2 boost period, the potential VQ is equal to the power source input potential VIN from the DC power source 60 and is higher than the third output voltage VO3. Moreover, as described above, the rectifier circuit 33 passes a current only in a direction from the output terminal 35 toward a connecting point between the inductor 6 and the main switch element 30. Therefore, in a type-1 or type-2 boost period, even when an energy is accumulated in the inductor 6, a current does not flow through the third output circuit, whereby the third output voltage VO3 does not decrease.

<Charge Period t7 of Boost Period TC3>

Also in the charge period of a type-3 boost period, the main switch control circuit 31 outputs the control signal VG3 at the L level, whereby the main switch element 30 is in the ON state. Therefore, also in the charge period of a type-3 boost period, the operation of the DC-DC converter 3 is the same as that of the DC-DC converter 2 of the second embodiment. Thus, an energy is accumulated in the inductor 6 also in the charge period t7.

<Discharge Period t8 of Boost Period TC3>

In the discharge period of a type-3 boost period, the main switch control circuit 31 outputs the control signals VG0 and VG3 at the H level, and the sub-switch control circuit 28 outputs the control signals VCT1 and VCT2 at the L level. Therefore, the main switch element 10 remains in the ON state, and the sub-switch elements 12 and 22 remain in the OFF state, while the main switch element 30 transitions from the ON state to the OFF state.

In the instant the main switch element 30 transitions from the ON state to the OFF state, an induced voltage is produced across the inductor 6 by the energy accumulated in the inductor 6, thereby significantly decreasing the potential VQ. Thereafter in the discharge period, the inductor 6 releases the accumulated energy. At this time, since the potential VQ is lower than the third output voltage VO3, a current flows from the third output circuit to the source-side ground of the main switch element 10 via the inductor 6 and the main switch element 10 (see the current ISW3, the current ILX and the current IMS1 in the discharge period t8 shown in FIG. 7). The current ISW3 is rectified by the rectifier circuit 33 and smoothed by the smoothing circuit 34, whereby the third output voltage VO3 decreases smoothly in the discharge period of a type-3 boost period.

Note that in a type-3 boost period, the sub-switch control circuit 28 outputs the control signal VCT1 at the L level. The level shift circuit 19 outputs the output-side potential VP of the inductor 6 as the control signal VG1 when the control signal VCT1 is at the L level. Therefore, the sub-switch element 12 is in the OFF state since the gate potential thereof is equal to the source potential thereof. Thus, in the discharge period of a type-3 boost period, a current is not passed through the first output circuit by an energy accumulated in the inductor 6, whereby the first output voltage VO1 does not increase. Similarly, the second output voltage VO2 does not increase in the discharge period of a type-3 boost period.

<Stand-By Period t9 of Boost Period TC3>

When the accumulated energy is completely released from the inductor 6, the potential VQ increases to 0 V. Thereafter, no current or voltage transition occurs in the DC-DC converter 3 until the control signal VG0 is brought to the H level again. In the stand-by period, the main switch control circuit 31 outputs the control signals VG0 and VG3 at the H level, and the sub-switch control circuit 28 outputs the control signals VCT1 and VCT2 at the L level. Therefore, the main switch element 10 remains in the ON state, and the main switch element 30 and the-sub-switch elements 12 and 22 remain in the OFF state. Thus, in the boost period TC3, the third output voltage VO3 decreases by a predetermined amount.

In the DC-DC converter 3, type-1 to type-3 boost periods as described above alternate with one another. Thus, the first and second output voltages VO1 and VO2 increase stepwise, and the third output voltage VO3 decreases stepwise. Therefore, with the DC-DC converter 3, the first and second output voltages VO1 and VO2 can be made precisely equal to their respective target voltages, and the third output voltage VO3, being a negative voltage, can be obtained by independently adjusting the increase of each of the first and second output voltages VO1 and VO2.

Note that the DC-DC converter 3 can also take various modifications, as with the DC-DC converter 2 of the second embodiment. Specifically, also in the DC-DC converter 3, the three types of boost periods may appear in any suitable order. Moreover, the DC-DC converter 3 may control the pulse widths of the control signals VCT1 and VCT2 from the sub-switch control circuit 28 and the pulse width of the control signal VG3 from the main switch control circuit 31 to adjust the increases (or decreases) of the first to third output voltages VO1 to VO3. Alternatively, the DC-DC converter 3 may not control the pulse widths. Moreover, in the remaining portion of the discharge period of each type of a boost period, the DC-DC converter 3 may increase or decrease a different output voltage other than an output voltage that is increased or decreased in that boost period. Moreover, the DC-DC converter 3 may output three or more positive voltages, and may output two or more negative voltages.

Figure 8A:
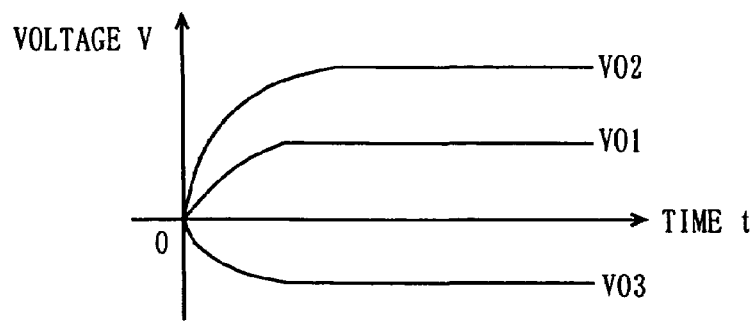
FIG. 8A to FIG. 8G each show a transition of the output voltage of the DC-DC converter of FIG. 6.
Figure 8B:
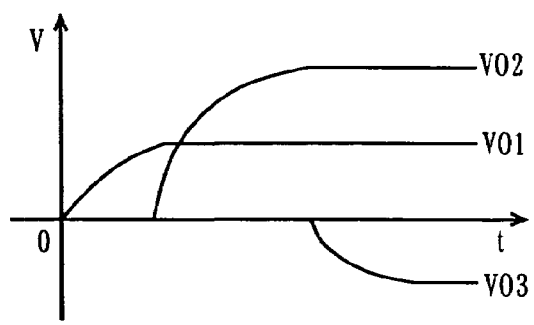
Figure 8C:
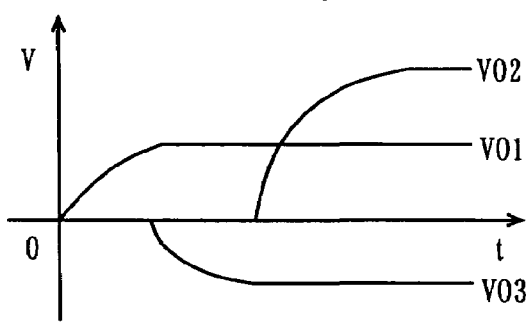
Figure 8D:
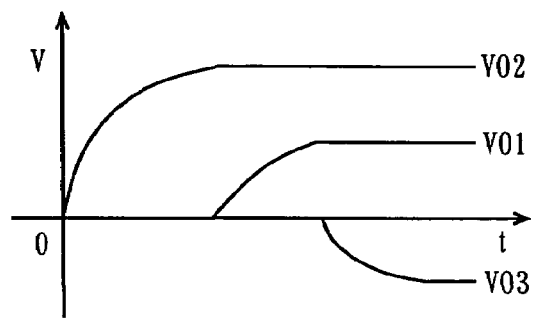
Figure 8E:
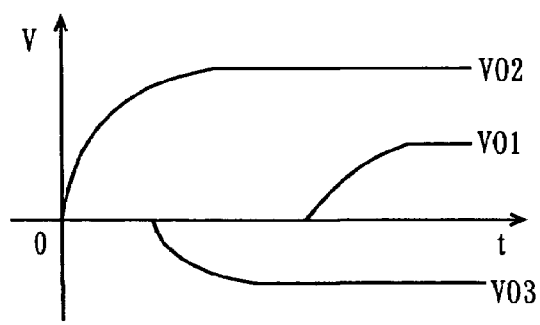
Figure 8F:
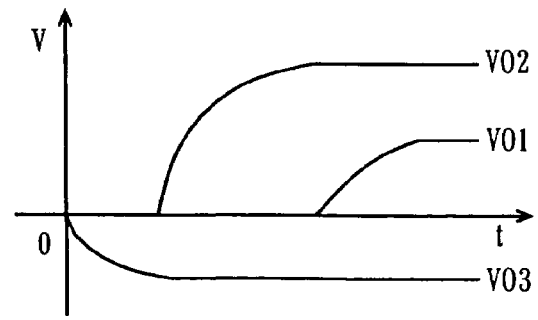
Figure 8G:
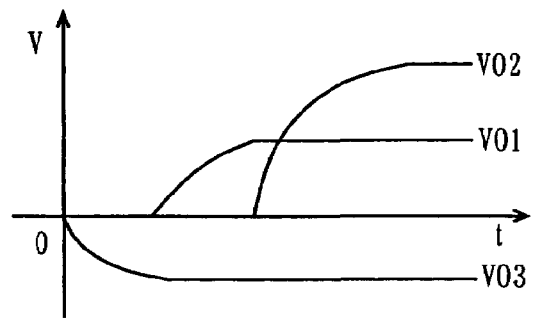

Referring to FIG. 8A to FIG. 8G, the effect of varying the order in which the three types of boost periods appear will now be described. FIG. 8A to FIG. 8G illustrate various output voltage transition patterns obtained by varying the order in which the three types of boost periods appear in the DC-DC converter 3. As described above, when type-1 to type-3 boost periods alternate with one another, the first to third output voltages VO1 to VO3 increase (decrease) in parallel to one another as illustrated in FIG. 8A. With a pattern in which type-1 boost periods are repeated a number of times, followed by type-2 boost periods repeated a number of times, and then by type-3 boost periods repeated a number of times, the first to third output voltages VO1 to VO3 reach their respective target voltages successively as illustrated in FIG. 8B. Similarly, the first to third output voltages VO1 to VO3 can be made to reach their respective target voltages successively in any other intended order, as illustrated in FIG. 8C to FIG. 8G, with a pattern in which the three types of boost periods are successively repeated a number of consecutive times in an appropriate order.

Thus, with the DC-DC converter 3, the first to third output voltages VO1 to VO3 can be made to reach their respective target voltages in any intended order by employing a suitable order in which the three types of boost periods appear. Therefore, even with a circuit or an electronic device that requires power source voltages of different levels to be inputted in a certain order, it is possible to provide the required power source voltages in the required order.

(Fourth Embodiment)

Figure 9:
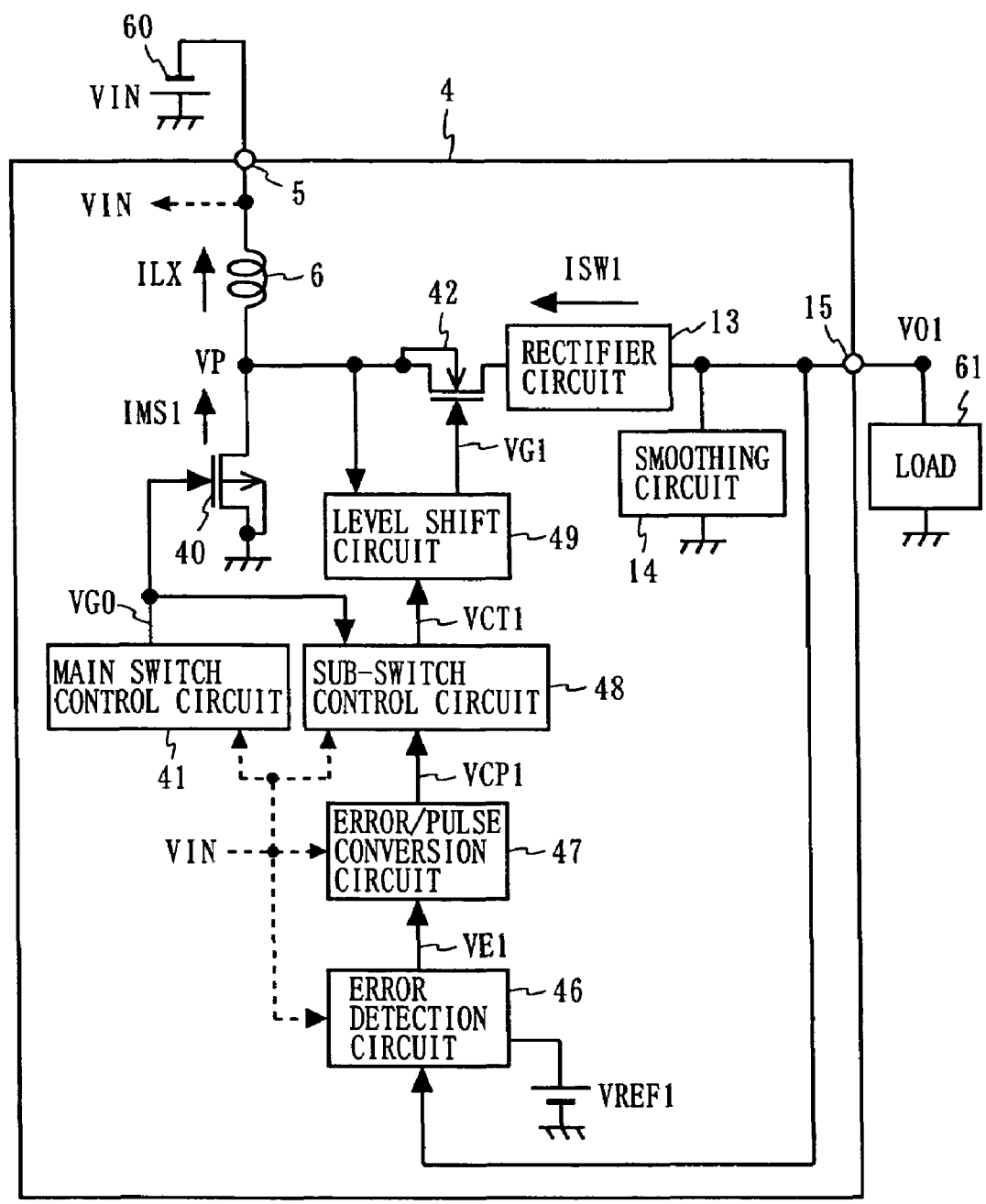
FIG. 9 illustrates a configuration of a DC-DC converter according to a fourth embodiment of the present invention.

FIG. 9 illustrates a configuration of a DC-DC converter 4 according to the fourth embodiment of the present invention. The DC-DC converter 4 of FIG. 9 is similar to the DC-DC converter 1 of the first embodiment, but is modified so as to output a negative output voltage VO1. The configuration and the operation of the DC-DC converter 4 are the same as those of the DC-DC converter 1 except that signals are of an opposite polarity. Accordingly, the following description focuses on the difference therebetween.

The DC-DC converter 4 includes elements that are basically the same as those of the DC-DC converter 1. Note however that a main switch element 40 of the DC-DC converter 4 is a P-channel MOS transistor, and a sub-switch element 42 thereof is an N-channel MOS transistor. Accordingly, each of a main switch control circuit 41, an error detection circuit 46, an error/pulse conversion circuit 47, a sub-switch control circuit 48 and a level shift circuit 49 is a circuit of an opposite polarity with respect to those of the DC-DC converter 1. The level shift circuit 49 outputs the output-side potential VP of the inductor 6 as the control signal VG1 when the control signal VCT1 is at the H level, and outputs a potential (VP+VM) higher than the output-side potential VP of the inductor 6 by a predetermined voltage (VM) as the control signal VG1 when the control signal VCT1 is at the L level. The voltage VM is set to a voltage value equal to or greater than the threshold voltage of the N-channel MOS transistor used as the sub-switch element 42.

The DC power source 60 is connected to the input terminal 5 in the reverse direction with respect to that in the DC-DC converter 1, and the rectifier circuit 13 is placed so as to pass a current in the reverse direction with respect to that in the DC-DC converter 1. In the DC-DC converter 4, the directions of the current ILX through the inductor 6 and the current IMS1 through the main switch element 40 are reversed from those in the DC-DC converter 1.

Figure 10:
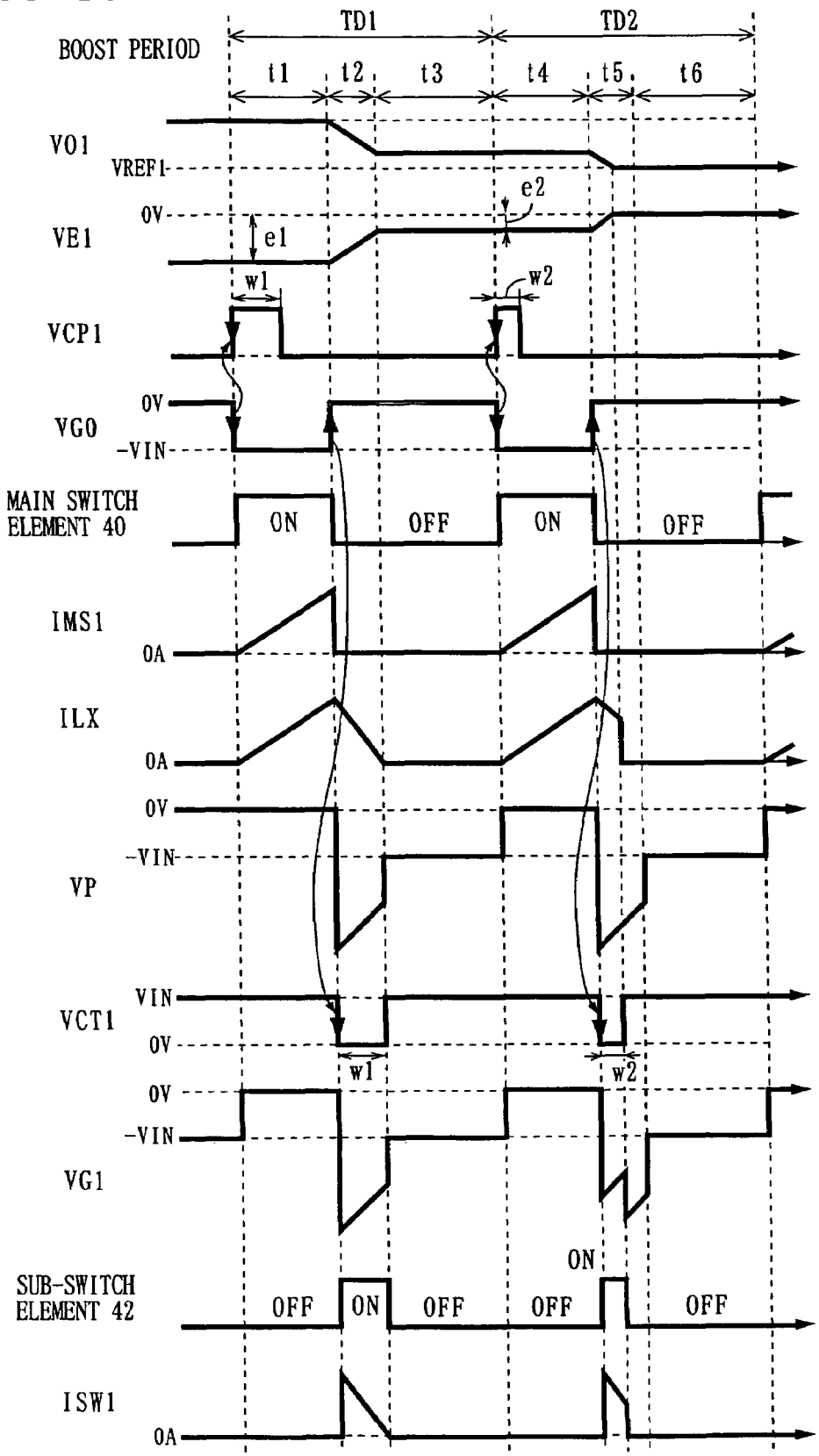
FIG. 10 is a diagram showing transitions of currents, voltages and switch elements in the DC-DC converter of FIG. 9.
Figure 11:
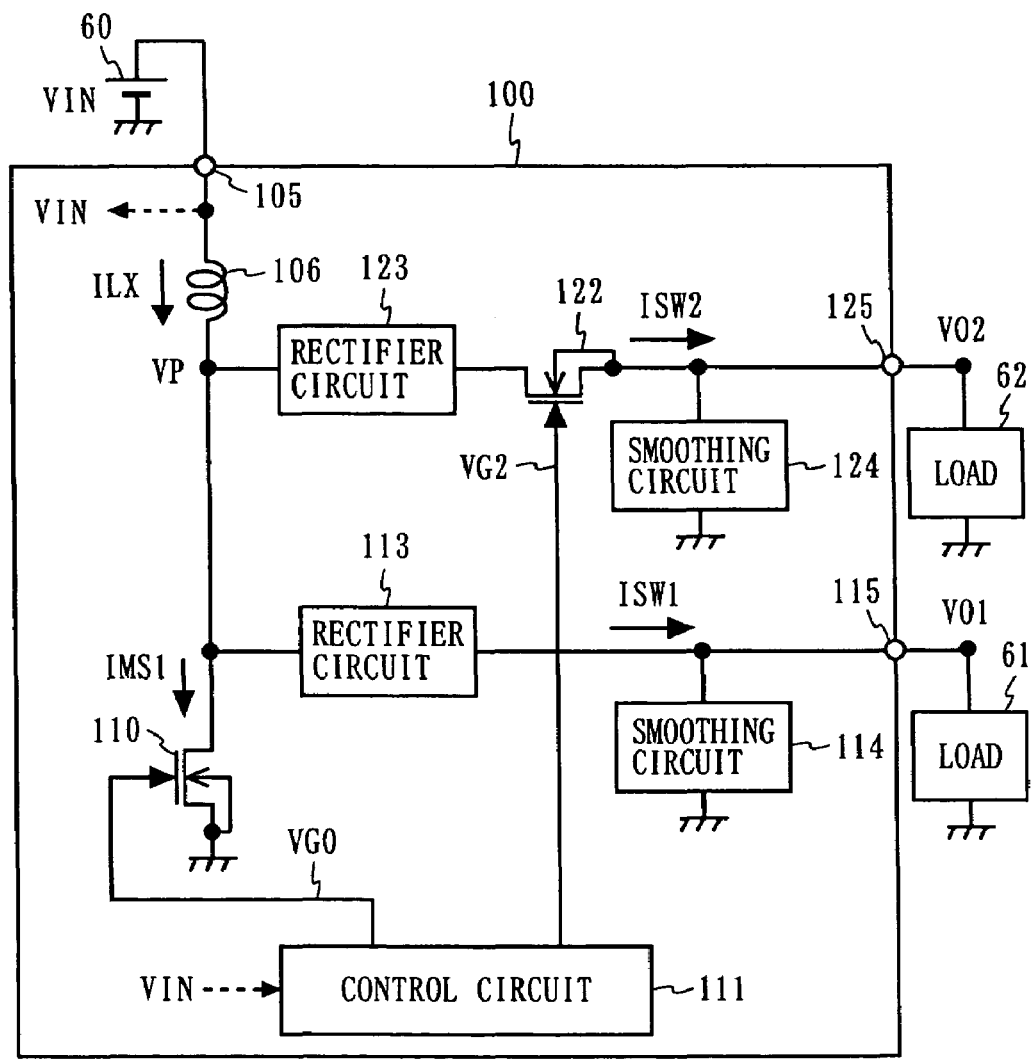
FIG. 11 illustrates a first configuration of a conventional DC-DC converter.
Figure 12:
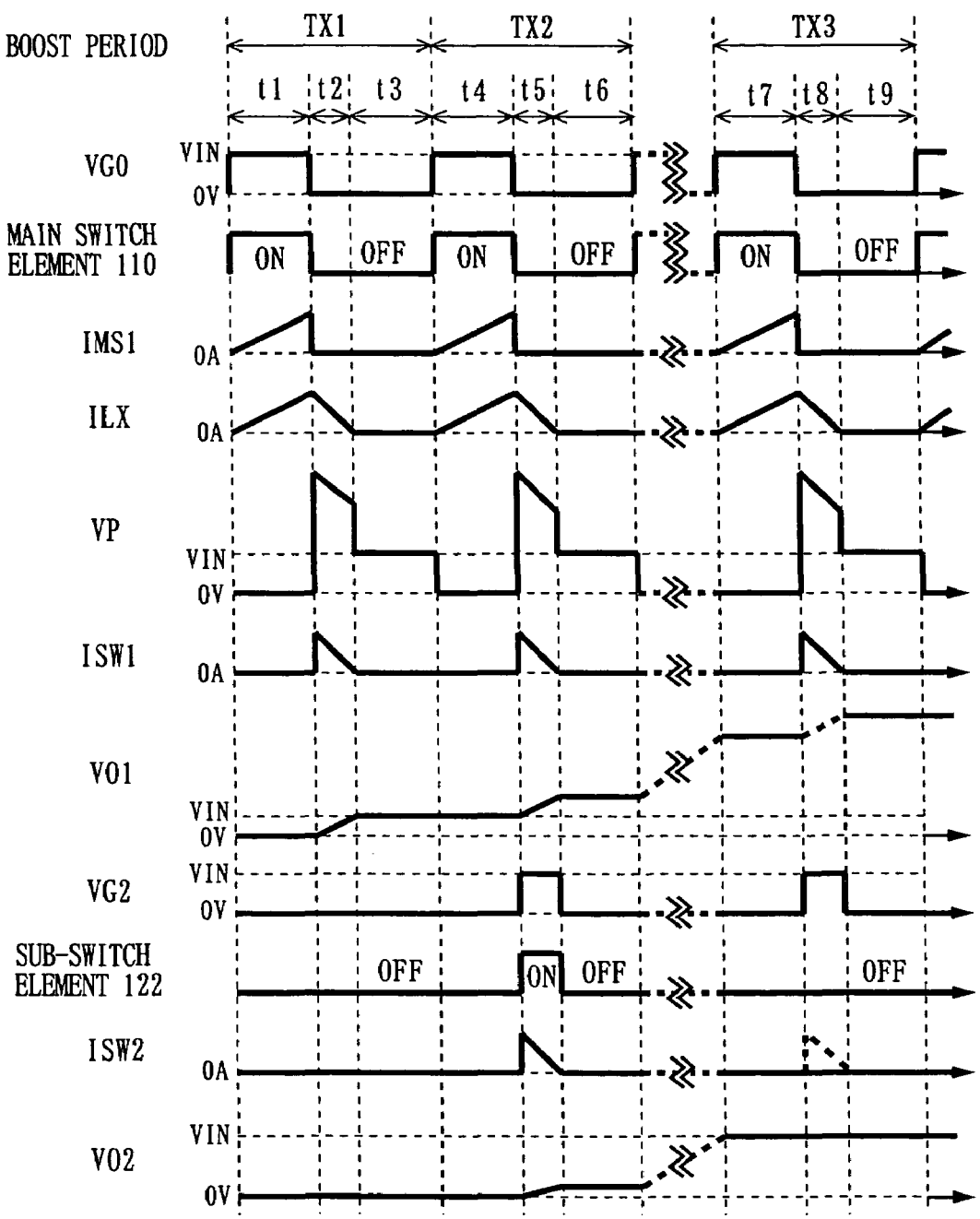
FIG. 12 is a diagram showing transitions of currents, voltages and switch elements in the DC-DC converter of FIG. 11.

FIG. 10 is a diagram showing transitions of currents, voltages and switch elements in the DC-DC converter 4. Referring to FIG. 10, the control signals VG0, VG1 and VCT1 and the potential VP are each of an opposite polarity with respect to those shown in FIG. 3. More specifically, since the DC power source 60 is connected in the reverse direction, a reversed induced voltage is produced across the inductor 6, whereby the potential VP is a negative value, and the control signals VG0, V1 and VCT1 each transition between the ground potential (0 V) and the power source input potential (−VIN).

Thus, with the DC-DC converter 4, the sub-switch element 42 can be turned ON/OFF accurately, and the negative output voltage VO1 can be made precisely equal to the target voltage. Moreover, the DC-DC converters 2 and 3 of the second and third embodiments can also be modified as in the present embodiment to provide a multiple-output DC-DC converter capable of outputting negative voltages.

While MOS transistors are used as main and sub-switch elements in the DC-DC converters of the embodiments described above, bipolar transistors, for example, may be used in place of the MOS transistors.

A DC-DC converter of the present invention, being capable of outputting a voltage precisely equal to the target voltage, can be used as a DC-DC converter, or the like, for supplying a power to an LCD, a flash memory, etc.

While the invention has been described in detail, the foregoing description is in all aspects illustrative and not restrictive. It is understood that numerous other modifications and variations can be devised without departing from the scope of the invention.

What is claimed is:

1. A DC-DC converter for boosting a voltage supplied from a power source, comprising:
    an inductor for receiving a power supply from the power source to accumulate an energy therein, producing an induced voltage higher than the supplied voltage, and releasing the accumulated energy;
    a main switch connected to one end of the inductor for selectively accumulating an energy in the inductor or releasing an energy from the inductor;
    a main switch control circuit for outputting a main switch control signal for switching the main switch between an ON state and an OFF state;
    an output terminal through which a current is passed when the inductor releases an energy to output a boosted voltage;
    a sub-switch for selectively passing a current through the output terminal when the inductor releases an energy;
    an error detection circuit for detecting a voltage difference between a voltage outputted from the output terminal and a target voltage;
    an error/pulse conversion circuit for outputting a PWM signal having a pulse width according to the voltage difference;
    a sub-switch control circuit for outputting a sub-switch control signal for switching the sub-switch between an ON state and an OFF state based on the PWM signal; and
    a voltage control circuit provided between the sub-switch control circuit and the sub-switch for controlling a potential applied to a control terminal of the sub-switch according to the sub-switch control signal.

2. The DC-DC converter according to claim 1, wherein the voltage control circuit receives, as a power supply, an output-side potential of the inductor, and applies, to the control terminal of the sub-switch, either the output-side potential of the inductor or a predetermined potential closer to a ground potential with respect to the output-side potential of the inductor, depending on the sub-switch control signal.

3. The DC-DC converter according to claim 2, wherein the voltage control circuit applies, to the control terminal of the sub-switch, the output-side potential of the inductor if the sub-switch control signal indicates the OFF state or the predetermined potential closer to the ground potential with respect to the output-side potential of the inductor if the sub-switch control signal indicates the ON state.

4. The DC-DC converter according to claim 3, wherein:
    the sub-switch is a P-channel MOS transistor; and
    the voltage control circuit applies, to a gate of the P-channel MOS transistor, the output-side potential of the inductor if the sub-switch control signal indicates the OFF state or a potential lower than the output-side potential of the inductor by an amount equal to or greater than a threshold voltage of the P-channel MOS transistor if the sub-switch control signal indicates the ON state.

5. The DC-DC converter according to claim 3, wherein:
    the sub-switch is an N-channel MOS transistor; and
    the voltage control circuit applies, to a gate of the N-channel MOS transistor, the output-side potential of the inductor if the sub-switch control signal indicates the OFF state or a potential higher than the output-side potential of the inductor by an amount equal to or greater than a threshold voltage of the N-channel MOS transistor if the sub-switch control signal indicates the ON state.

6. The DC-DC converter according to claim 1, wherein:
    the main switch is a transistor of a first polarity; and
    the sub-switch is a transistor of a second polarity opposite to the first polarity.

7. The DC-DC converter according to claim 1, wherein the DC-DC converter includes a plurality of sets of the sub-switch, the output terminal, the error detection circuit, the error/pulse conversion circuit and the voltage control circuit.

8. The DC-DC converter according to claim 7, wherein the sub-switch control circuit limits, to one at most, the number of sub-switch control signals to be outputted simultaneously when the inductor releases an energy.

9. The DC-DC converter according to claim 7, wherein in a single boost operation, the sub-switch control circuit selects one PWM signal at most from among a plurality of PWM signals outputted from the plurality of error/pulse conversion circuits, and outputs only the selected PWM signal as a valid sub-switch control signal.

10. The DC-DC converter according to claim 7, wherein in a single boost operation, the sub-switch control circuit selects PWM signals from among a plurality of PWM signals outputted from the plurality of error/pulse conversion circuits, and exclusively outputs the selected PWM signals as valid sub-switch control signals.

11. The DC-DC converter according to claim 1, further comprising:
    a reverse voltage output terminal, connected to an input side of the inductor, through which a current is passed when the inductor releases an energy to output a voltage boosted in a reverse direction with respect to the voltage outputted from the output terminal; and
    a reverse voltage switch provided between the power source and the inductor for selectively passing a current through the reverse voltage output terminal when the inductor releases an energy,
    wherein the main switch control circuit outputs, in addition to the main switch control signal, a control signal for the reverse voltage switch.

* * * * *